United States Patent
Mizoguchi et al.

(10) Patent No.: US 8,449,123 B2
(45) Date of Patent: May 28, 2013

(54) IMAGE FORMING APPARATUS AND REAR PROJECTION DISPLAY APPARATUS

(75) Inventors: Yasushi Mizoguchi, Suwa (JP); Hidekazu Kobayashi, Hara (JP); Shuichi Wakabayashi, Okaya (JP); Taisuke Yamauchi, Matsumoto (JP); Takashi Takeda, Suwa (JP)

(73) Assignee: Seiko Epson Corporation (JP)

( * ) Notice: Subject to any disclaimer, the term of this patent is extended or adjusted under 35 U.S.C. 154(b) by 322 days.

(21) Appl. No.: 12/968,414

(22) Filed: Dec. 15, 2010

(65) Prior Publication Data

US 2011/0205456 A1  Aug. 25, 2011

(30) Foreign Application Priority Data

Feb. 24, 2010  (JP) .................................. 2010-039382

(51) Int. Cl.
  *G02F 1/1335*  (2006.01)
  *G02F 1/01*  (2006.01)
  *G02B 26/10*  (2006.01)

(52) U.S. Cl.
  USPC ........................................... 353/79; 359/443

(58) Field of Classification Search
  USPC ......... 353/74–79, 88; 349/2, 5, 7, 8; 345/173, 345/1.2, 9, 174, 175; 359/443, 454
  See application file for complete search history.

(56) References Cited

U.S. PATENT DOCUMENTS

| 7,914,154 B2 * | 3/2011 | Obi et al. ..................... 353/79 |
| 8,272,743 B2 * | 9/2012 | Taylor et al. ................. 353/28 |
| 2005/0110964 A1 * | 5/2005 | Bell et al. .................... 353/122 |
| 2007/0024822 A1 * | 2/2007 | Cortenraad et al. ........... 353/79 |
| 2011/0085095 A1 * | 4/2011 | Yamauchi ..................... 349/5 |

FOREIGN PATENT DOCUMENTS

| JP | 2009-134194 | 6/2009 |
| JP | 2009-229903 | 10/2009 |

* cited by examiner

*Primary Examiner* — William C Dowling
(74) *Attorney, Agent, or Firm* — Harness, Dickey & Pierce, P.L.C.

(57) ABSTRACT

An image forming apparatus includes: a screen having a display surface; and a projector that renders an image by scanning light on the display screen, wherein the screen selects, independently in respective regions of the display surface, a light transmission state in which the light is transmitted and a light diffusion state in which the light is diffused, the screen being configured such that the region where address light is irradiated is in the light diffusion state and the region where the address light is not irradiated is in the light transmission state, and the projector scans the address light on the display surface such that an area of the display surface corresponding to an image displayed on the display surface changes to the light diffusion state.

14 Claims, 17 Drawing Sheets

IMAGE FORMING APPARATUS AND REAR PROJECTION DISPLAY APPARATUS

BACKGROUND

1. Technical Field

The present invention relates to an image forming apparatus and a rear projection display apparatus.

2. Related Art

For example, as an apparatus that displays a desired image (in particular, an advertisement such as CM) on a screen, there is known an apparatus configured to scan a laser beam emitted from a light source in a lateral direction and a longitudinal direction of a screen using an optical scanner and a galvanometer mirror (see, for example, JP-A-2009-134194).

However, in such an apparatus, problems explained below occur because the screen always has light diffusion properties. First, when an image is not formed on the screen, the screen disturbs the sight. Second, an image is not always displayed over the entire area of the screen. In some case, an image is displayed only in a part (e.g., the center) of the screen. In such a case, a portion of the screen on which the image is not displays disturbs the sight. Third, when an image is displayed on the screen widely known to the public, it is difficult to attract attention of observers. In other words, even if an image is displayed on the screen that is evidently the screen, since this is common to the observers, the observers feel no novelty and have no particular interest in the displayed image.

SUMMARY

An advantage of some aspects of the invention is to provide an image forming apparatus and a rear projection display apparatus that can effectively attract observer's interest using a substantially transparent screen.

According to an aspect of the invention, there is provided an image forming apparatus including: a screen having a display surface; and a projector that renders an image by scanning light on the display screen. The screen can select, independently in respective regions of the display surface, a light transmission state in which the light is transmitted and a light diffusion state in which the light is diffused. The screen is configured such that the region where address light is irradiated is in the light diffusion state and the region where the address light is not irradiated is in the light transmission state. The projector scans the address light on the display surface such that an area of the display surface corresponding to an image displayed on the display surface changes to the light diffusion state.

This makes it possible to provide an image forming apparatus that can effectively attract observer's interest using a substantially transparent screen. In particular, the observer feels as if an image displayed on the screen stands out and is more interested in the image. Since the screen is transparent when not in use, the screen does not disturb the sight.

In the image forming apparatus according to the aspect, it is preferred that the address light is an infrared ray.

This makes it possible to prevent the address light from being visually recognized by the observer, prevent the address light from affecting a hue of an image displayed on the display surface, and display a desired image on the display surface.

In the image forming apparatus according to the aspect, it is preferred that the projector scans the address light and scans display light for displaying the image in the area changed to the light diffusion state by the irradiation of the address light to thereby display a desired image on the display surface.

This makes it possible to perform, with one projector, a step of forming a light diffusion area on the display surface and a step of forming an image in the light diffusion area. Therefore, the configuration of the image forming apparatus is simplified.

In the image forming apparatus according to the aspect, it is preferred that the projector scans combined light obtained by combining the address light and the display light on the display screen.

This makes it possible to simultaneously irradiate the display light and the address light on the same region of the display surface. Therefore, it is possible to surely irradiate the display light on a region changed to the light diffusion state and display a desired image on the screen.

In the image forming apparatus according to the aspect, it is preferred that the projector further includes: an address light source that emits the address light; a display light source that emits the display light; and a light scanning unit that reflects the combined light and scans the combined light on the display surface.

Consequently, the configuration of the projector is simplified.

In the image forming apparatus according to the aspect, it is preferred that the light scanning unit includes an optical scanner in which a movable plate including a light reflecting section having light reflection properties is provided to be pivotable in at least one direction or two directions orthogonal to each other and that scans light reflected by the light reflecting section on the display surface.

Consequently, the configuration of the light scanning unit is simplified.

In the image forming apparatus according to the aspect, it is preferred that the projector includes a control unit that determines, from image data displayed on the display surface, an area of the display surface changed to the light diffusion state and controls actuation of the address light source, the display light source, and the light scanning unit such that the address light is irradiated on the determined area and the display light is irradiated on an area changed to the light diffusion state by the irradiation of the address light.

This makes it possible to more surely change only an area of the display surface where a user desires to display an image to the light diffusion state and display a desired image on the display surface.

In the image forming apparatus according to the aspect, it is preferred that, when directions orthogonal to each other in plan view of the display surface are represented as x direction and y direction, the light scanning unit scans the combined light in the y direction while scanning the combined light in the x direction to thereby scan the combined light on the display surface, and the control unit determines, on the basis of the image data, the amplitude of the combined light scanned on the display surface by the light scanning unit in the x direction and the amplitude of the combined light in the y direction.

This makes it possible to efficiently scan light on the display surface.

In the image forming apparatus according to the aspect, it is preferred that the projector is not arranged in an area formed by extending a contour of the screen in a direction orthogonal to the display surface.

This makes it possible to prevent observation of an image displayed on the display surface from being disturbed by the projector. Therefore, an excellent advertisement function can be shown.

In the image forming apparatus according to the aspect, it is preferred that the projector is set within 1 m from a region of the display surface closest to the projector.

This makes it possible to effectively prevent light irradiated from the projector from being blocked by an obstacle such as a pedestrian and more surely display a desired image on the display surface.

In the image forming apparatus according to the aspect, it is preferred that, in the screen, a first substrate having light transmission properties on which a first electrode is formed, a photoconductive film on which electric resistance of a region where the address light is irradiated falls, a liquid crystal layer in which liquid crystal is dispersed, and a second substrate having light transmission properties on which a second electrode is formed is provided in this order from the display surface side.

This makes it possible to obtain a screen that can easily switch the light transmission state and the light diffusion state.

In the image forming apparatus according to the aspect, it is preferred that the liquid crystal layer is a liquid crystal polymer composite layer in which the liquid crystal and a polymer are separated, the liquid crystal and the polymer have refractive index anisotropy, and, when voltage is applied between the first electrode and the second electrode, the liquid crystal layer takes, according to the intensity of voltage applied to the liquid crystal polymer composite layer, the light transmission state in which the liquid crystal and the polymer are oriented in the same direction and the light diffusion state in which the liquid crystal and the polymer are orientated in different directions.

This makes it possible to obtain a screen suitable for a use of the image forming apparatus that, when voltage is not applied thereto, is in the light transmission state in which the screen is colorless and transparent and, when voltage is applied thereto, changes to the light diffusion state in which the screen is opaque.

In the image forming apparatus according to the aspect, it is preferred that, when the intensity of the voltage at which the light transmission state and the light diffusion state are switched is represented as V, in a state in which voltage for not increasing the intensity of the voltage applied to the liquid crystal polymer composite layer to be larger than the intensity V is applied between the first electrode and the second electrode, the address light is irradiated on a region of the display surface changed to the light diffusion state and electric resistance of a region of the photoconductive film where the address light is irradiated is reduced, whereby the intensity of voltage acting on a region of the liquid crystal polymer composite layer where the address light is irradiated is increased to be larger than the intensity V and a region of the display surface where the address light is irradiated is changed from the light transmission state to the light diffusion state.

This makes it possible to set, with simple control, only an area of the display surface of the screen where an image is displayed to the light diffusion state and set the other areas to the light transmission state.

According to another aspect of the invention, there is provided a rear projection display apparatus including: a housing; a screen that is fixed to the housing and has a display surface; and a projector that is arranged in the housing and scans light on the display surface to thereby render an image. The screen can select, independently in respective regions of the display surface, a light transmission state in which the light is transmitted and a light diffusion state in which the light is diffused. The screen is configured such that the region where address light is irradiated is in the light diffusion state and the region where the address light is not irradiated is in the light transmission state. The projector scans the address light on the display surface such that an area of the display surface corresponding to an image displayed on the display surface changes to the light diffusion state.

This makes it possible to provide a rear projection display apparatus that can effectively attract observer's interest using a substantially transparent screen.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention are explained below with reference to the accompanying drawings.

First Embodiment

First, an image forming apparatus according to a first embodiment of the invention is explained.

Figure 1:
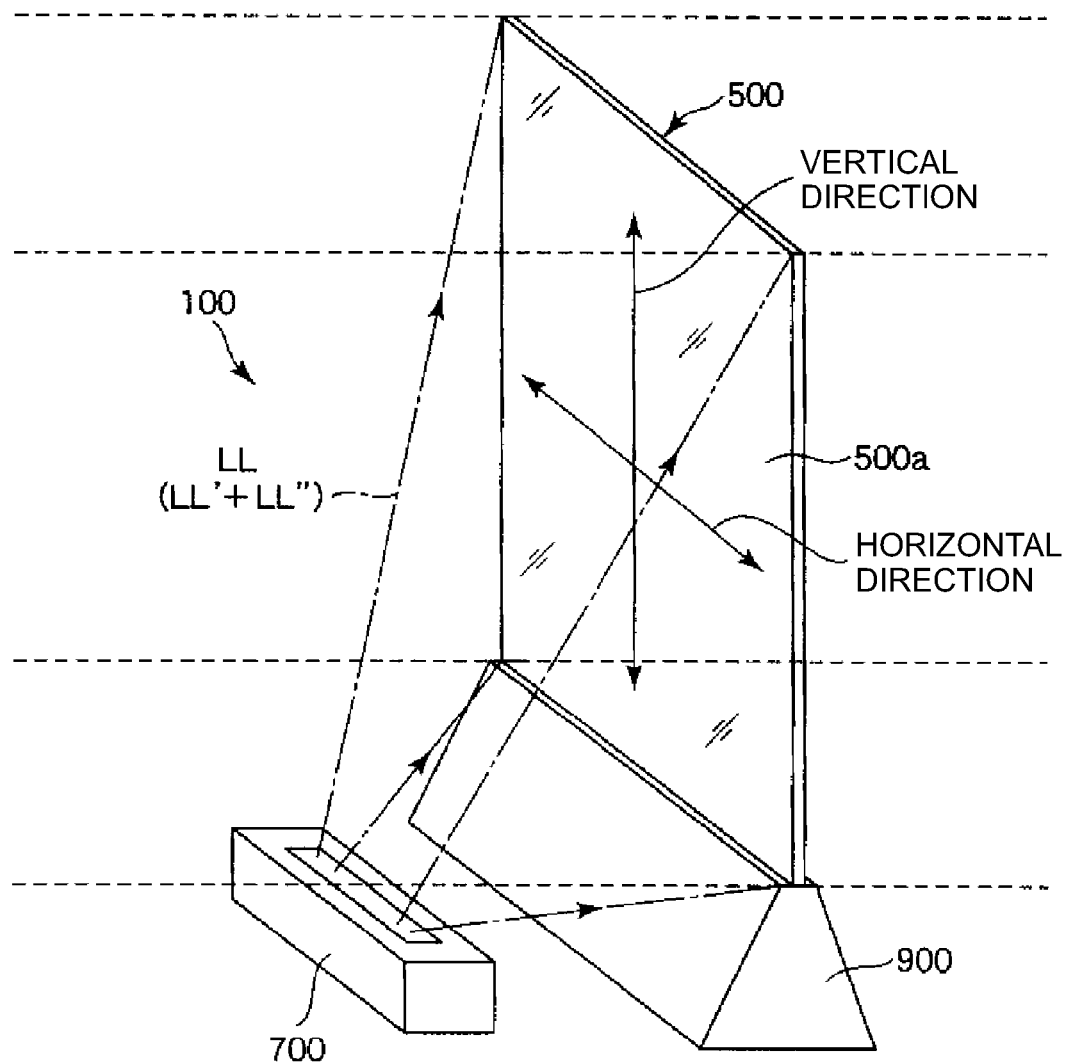
FIG. 1 is a diagram showing an image forming apparatus according to a first embodiment of the invention.
Figure 2:
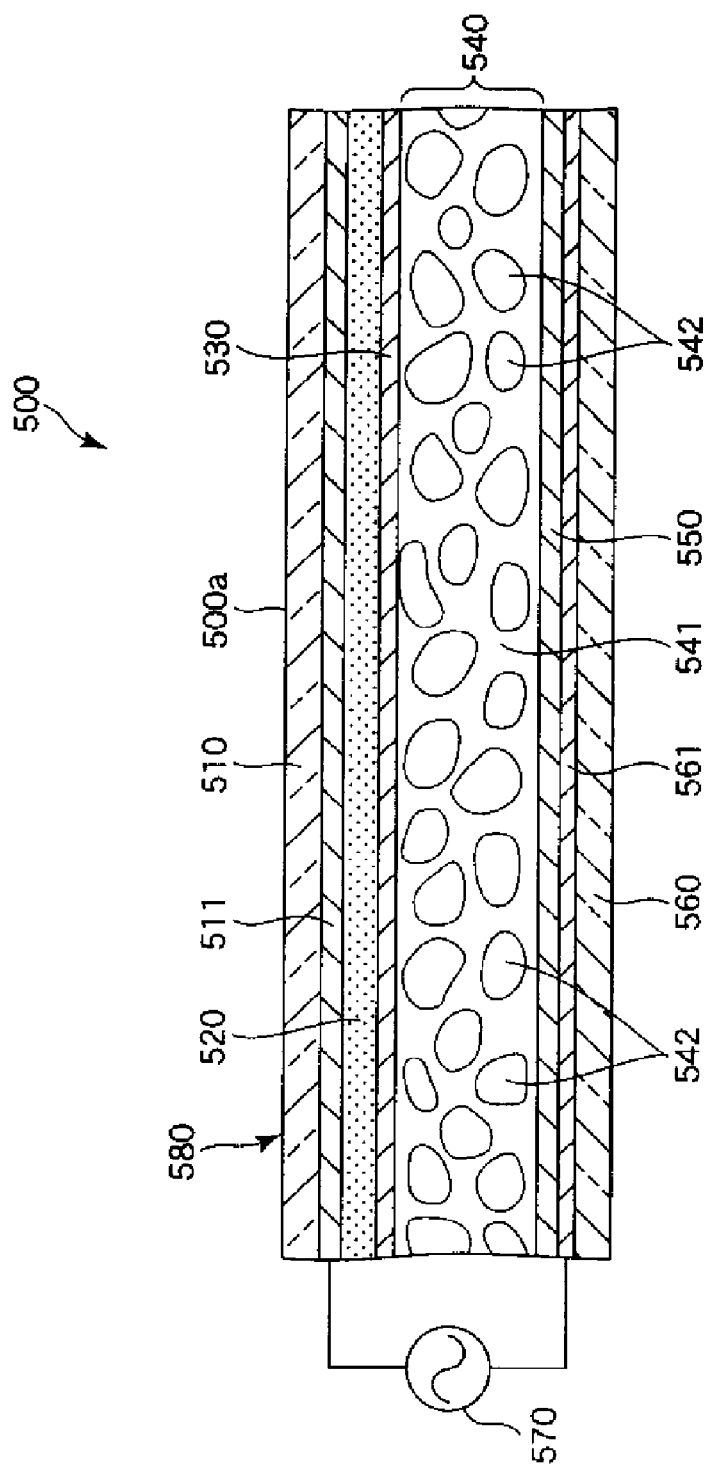
FIG. 2 is a sectional view of a screen of the image forming apparatus shown in FIG. 1.
Figure 3:
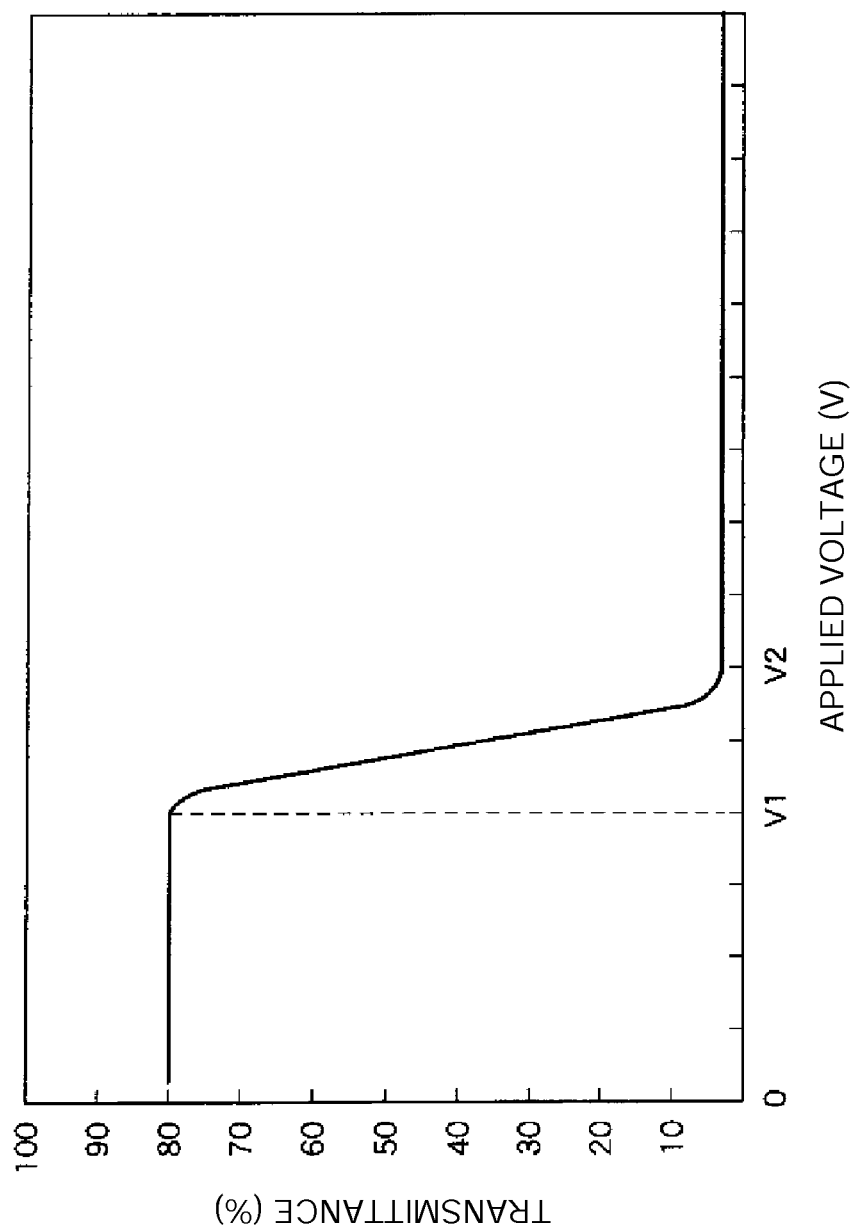
FIG. 3 is a graph showing a relation between the transmittance of a screen and the intensity of voltage applied to a liquid crystal polymer composite layer.
Figure 4:
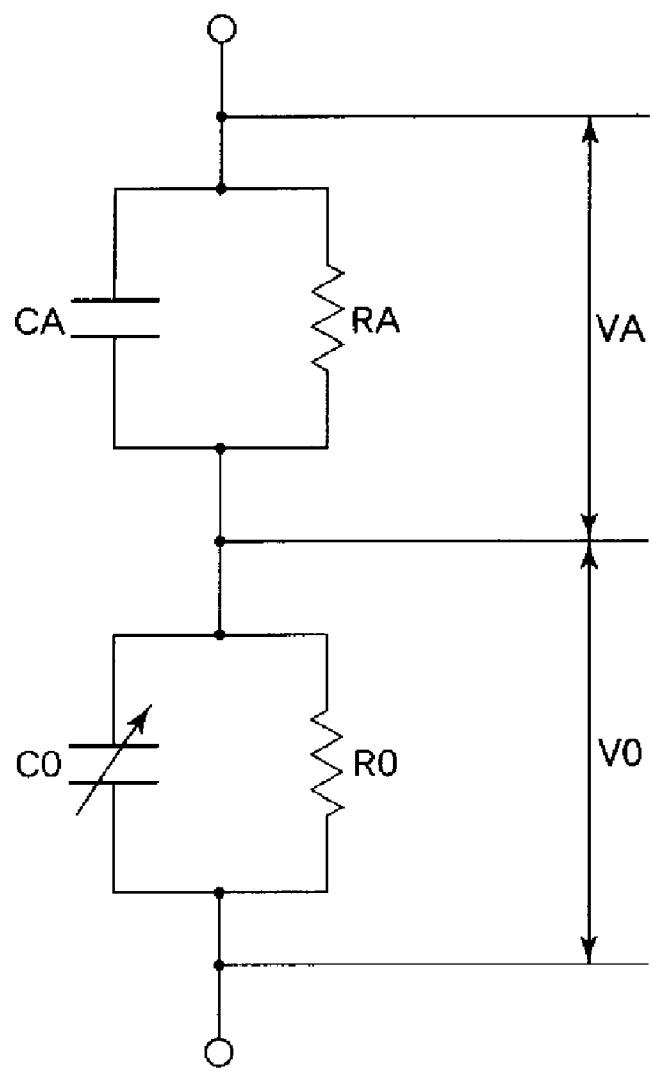
FIG. 4 is a diagram showing an equivalent circuit of the screen.
Figure 5:
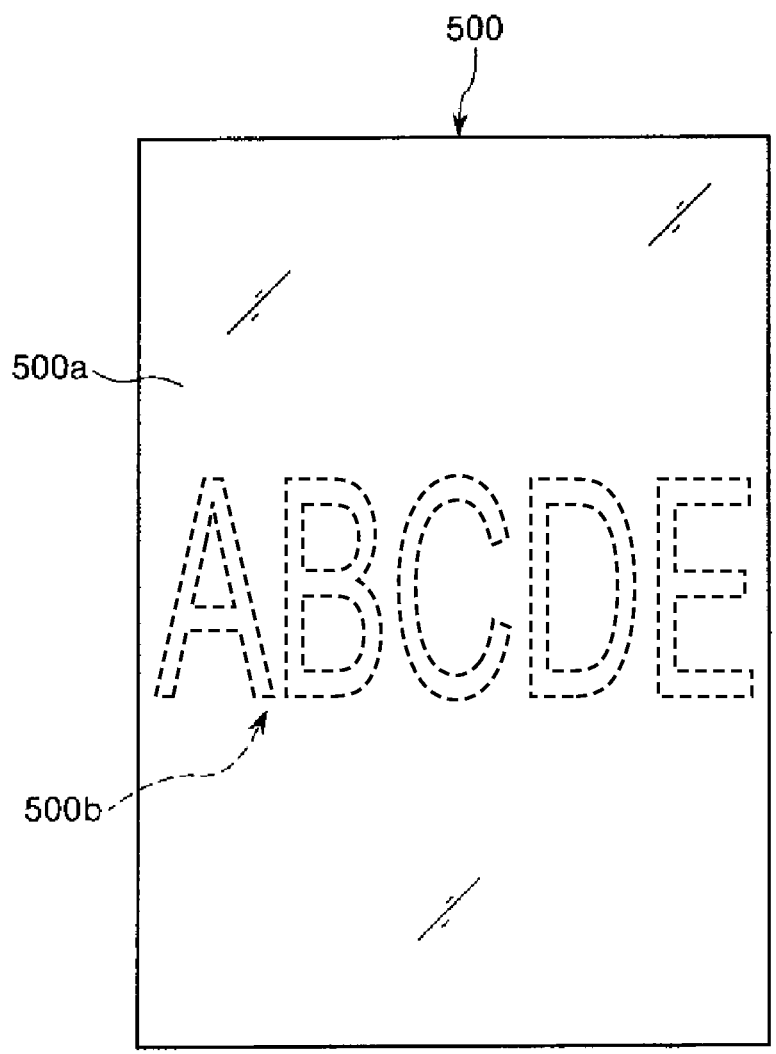
FIG. 5 is a diagram showing the operation of the screen.
Figure 6:
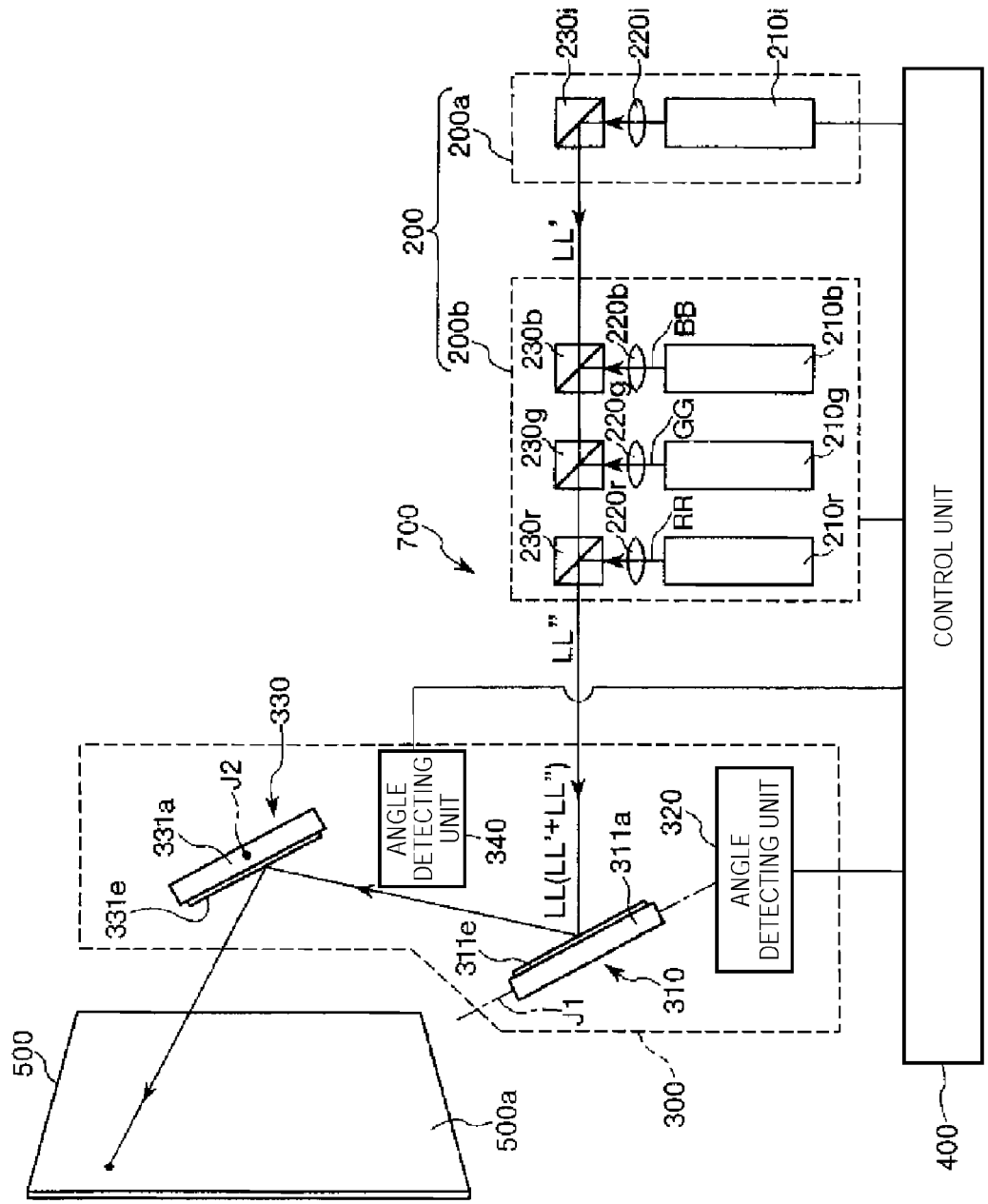
FIG. 6 is a diagram showing a schematic configuration of a projector.
Figure 7:
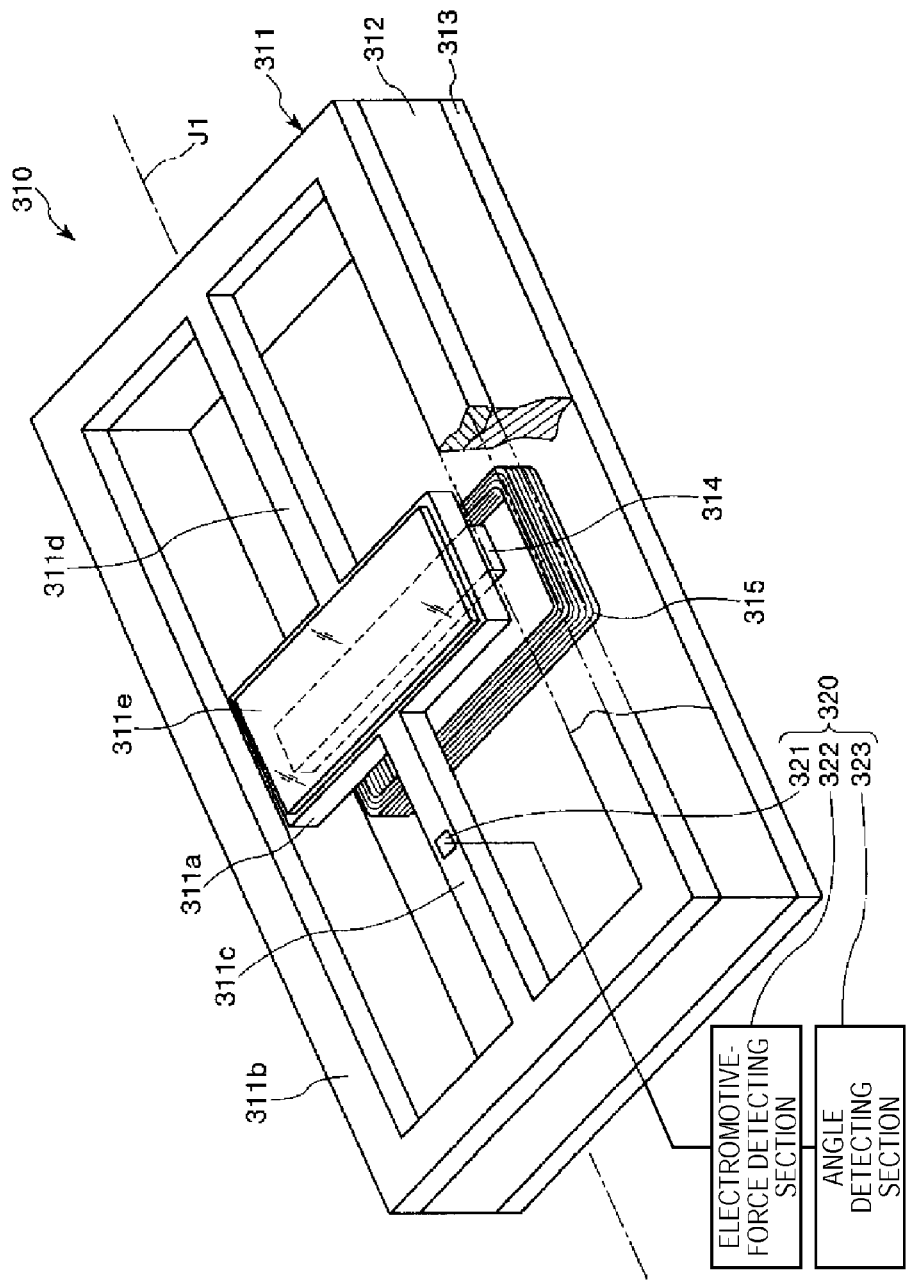
FIG. 7 is a perspective view of an optical scanner of the projector.
Figure 8A:
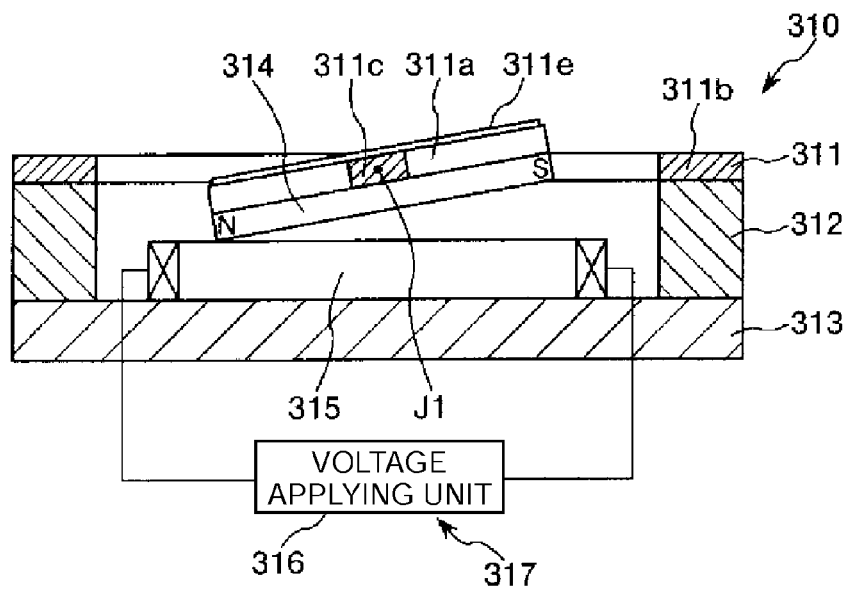
FIGS. 8A and 8B are diagrams showing the operation of the optical scanner shown in FIG. 7.
Figure 8B:
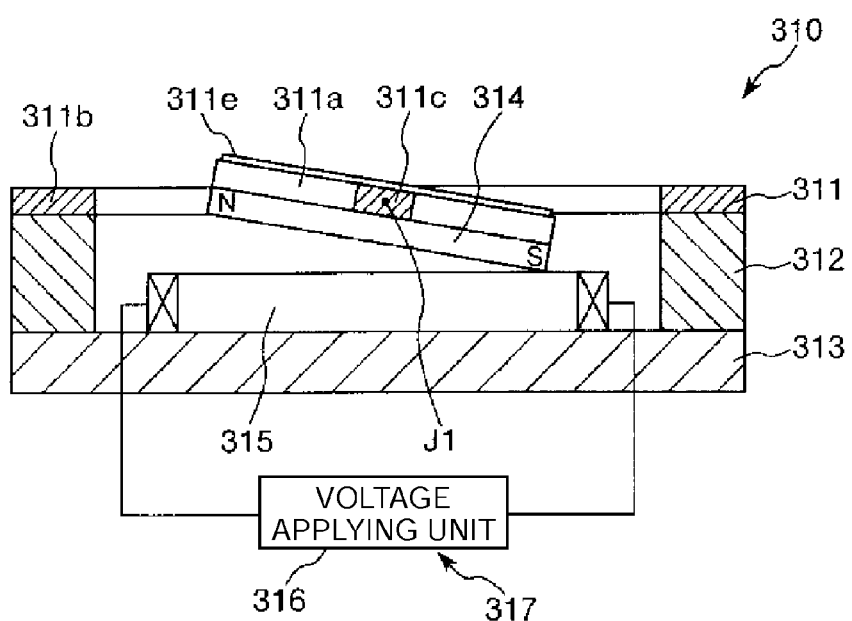
Figure 9:
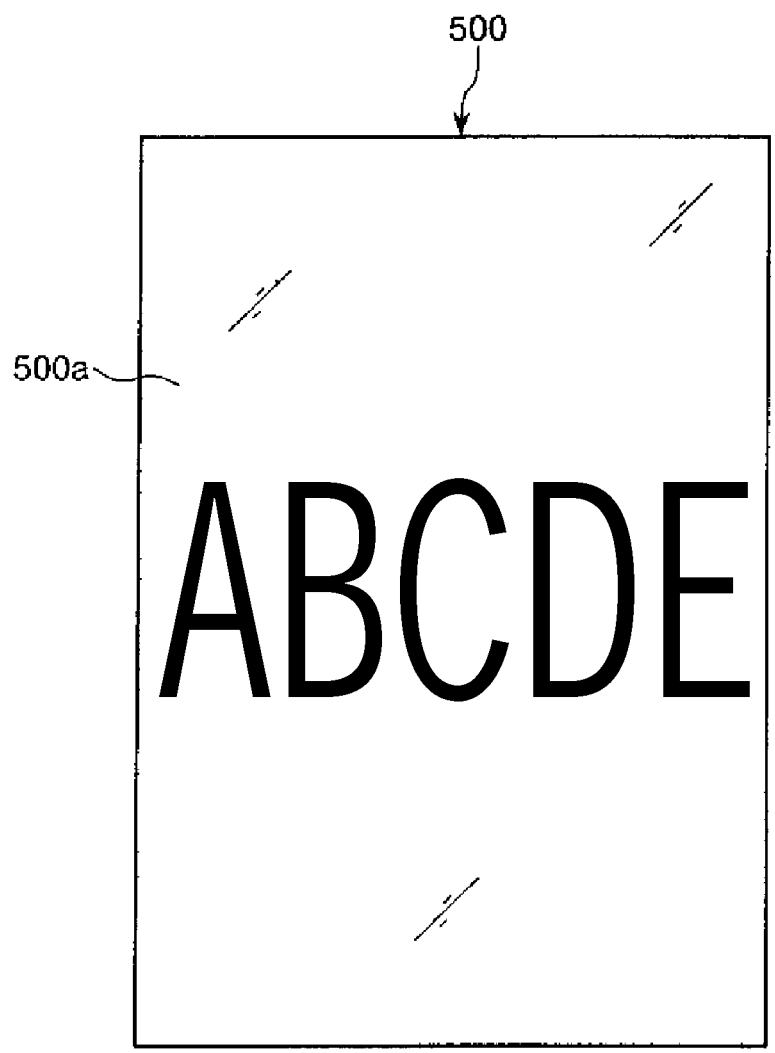
FIG. 9 is a plan view showing an example of an image displayed on the screen.
Figure 10:
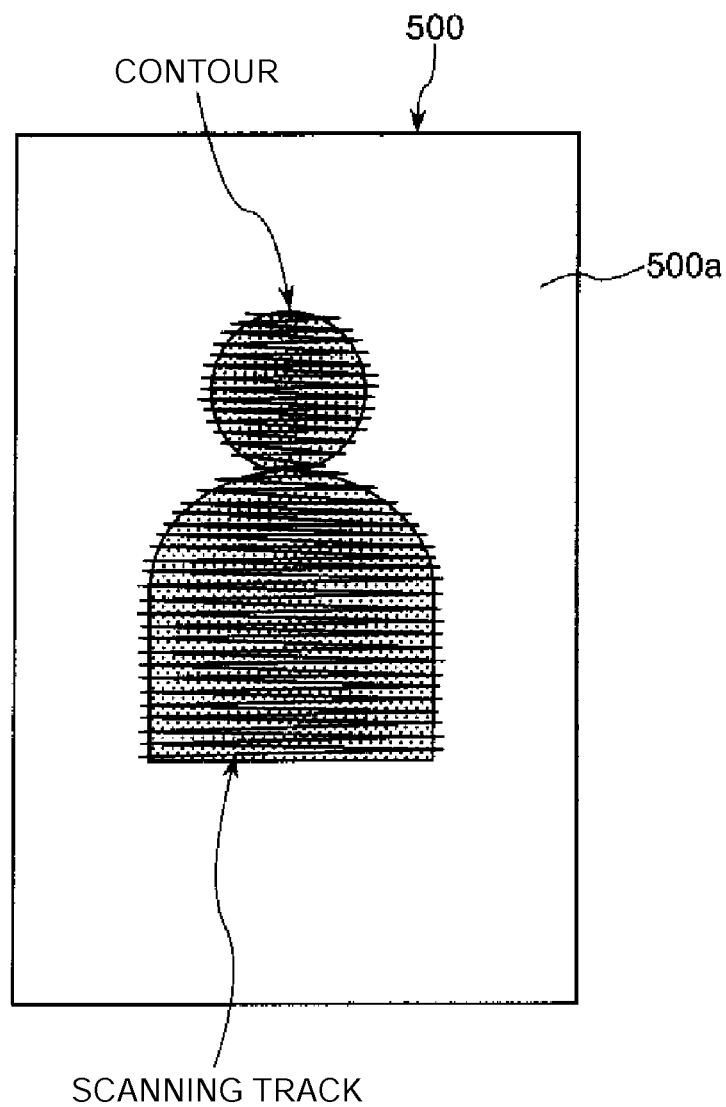
FIG. 10 is a plan view for explaining the driving of the projector.

FIG. 1 is a diagram showing the image forming apparatus according to the first embodiment of the invention. FIG. 2 is a sectional view of a screen of the image forming apparatus shown in FIG. 1. FIG. 3 is a graph showing a relation between the transmittance of the screen and the intensity of voltage applied to a liquid crystal polymer composite layer. FIG. 4 is a diagram showing an equivalent circuit of the screen. FIG. 5 is a diagram showing the operation of the screen. FIG. 6 is a diagram showing a schematic configuration of a projector. FIG. 7 is a perspective view of an optical scanner of the projector. FIGS. 8A and 8B are diagrams showing the operation of the optical scanner shown in FIG. 7. FIG. 9 is a plan view showing an example of an image displayed on the screen. FIG. 10 is a plan view for explaining the driving of the projector. In the following explanation, for convenience of explanation, an upper side and a lower side in FIGS. 1, 2, 5, and 7 to 10 are respectively referred to as "upper" and "lower". A left side and a right side in FIG. 7 are respectively referred to as "left" and "right".

An image forming apparatus 100 shown in FIG. 1 includes a screen (a display object) 500 set in a construction such as a building or in the outdoor and a projector 700 that displays a predetermined image such as a still image or a moving image on a display surface 500a of the screen 500.

In this embodiment, the screen 500 is supported by a stage 900 and set without being fixed to or stood against, for example, a wall of a construction. When an image is not displayed, the screen 500 is colorless and transparent (a light transmission state). The rear of the screen 500 can be visually recognized as if the screen 500 is a glass plate. When an image is displayed on the screen 500 by the projector 700, only an area of the display surface 500a where the image is formed is changed to an opaque state (a light diffusion state). A laser beam is irradiated on the area in the opaque state from the projector 700, whereby a desired image is displayed on the screen 500. In this case, an area where the image is not displayed keeps the transparent state. Therefore, with the image forming apparatus 100 having such a configuration, first, there is an advantage that the screen 500 does not disturb the sight when not in use (when an image is not displayed). Second, when in use (when an image is displayed), since an image is displayed on a transparent plate, it is possible to cause an observer to feel as if the image stands out and effectively arouse the observer's interest in the displayed image. In other words, with the image forming apparatus 100, it is possible to show an excellent advertisement effect.

The projector 700 according to this embodiment is provided near the screen 500 and displays an image on the screen 500 through near projection. In this embodiment, the projector 700 is provided in lower front of the screen 500. The projector 700 is provided within 1 m from a region of the display surface 500a of the screen 500 closest to the projector 700. Since the projector 700 is provided near the screen 500 in this way, it is possible to effectively prevent a laser beam LL irradiated from the projector 700 from being blocked by an obstacle such as a pedestrian and more surely display a desired image on the display surface 500a.

The projector 700 according to this embodiment is not arranged in an area formed by extending a contour of the screen 500 in a direction orthogonal to the display surface 500a. In other words, the projector 700 is set on the outside of an area surrounded by a dotted line in FIG. 1. This makes it possible to effectively prevent observation of an image displayed on the display surface 500a from being disturbed by the projector 700. Therefore, the observer can easily observe the image displayed on the display surface 500a. An excellent advertisement function can be shown.

The screen 500 and the projector 700 are explained in detail below in order.

Screen 500

As shown in FIG. 2, the screen 500 includes a screen main body 580 formed by laminating a first substrate 510 on which a first electrode 511 is formed, a photoconductive film 520, an orientation film 530, a liquid crystal polymer composite layer (a liquid crystal layer) 540, an orientation film 550, and a second substrate 560 on which a second electrode 561 is formed from the display surface 500a side in this order and a voltage applying unit 570 that applies voltage between the first electrode 511 and the second electrode 561. By adopting such a configuration, it is possible to obtain the screen 500 that can switch the light transmission state and the light diffusion state.

The first substrate 510 and the second substrate 560 are respectively formed of sheet-like (flat) members and have a function of supporting and protecting members arranged between the substrates. The first substrate 510 and the second substrate 560 have light transmission properties and are substantially colorless and transparent. The first substrate 510 and the second substrate 560 may have flexibility or may be rigid.

Materials forming the first substrate 510 and the second substrate 560 are respectively not specifically limited. For example, a polymer film of glass, silicon, polyester (polyethylene terephthalate), polysulfone, polyether sulfone, or polycarbonate can be used.

The film-like first electrode 511 is formed on the lower surface (a surface on the liquid crystal polymer composite layer 540 side) of the first substrate 510. The film-like second electrode 561 is formed on the upper surface (a surface on the liquid crystal polymer composite layer 540 side) of the second substrate 560. The first electrode 511 and the second electrode 561 have light transmission properties and are substantially colorless and transparent. Such first electrode 511 and second electrode 561 are electrically connected to the voltage applying unit 570. When the voltage applying unit 570 applies voltage between the first electrode 511 and the second electrode 561, an electric field is generated between the electrodes and the generated electric field acts on the photoconductive film 520 and the liquid crystal polymer composite layer 540.

Materials forming the first electrode 511 and the second electrode 561 are respectively not specifically limited as long as the materials substantially have electric conductivity and are substantially colorless and transparent. Examples of the materials include various conductive materials including a metal material such as gold, silver, copper, aluminum, or an alloy containing these kinds of metal, a carbon material such as carbon black, an electron conductive polymer material such as polyacetylene, polyfluorene, or derivatives of polyacetylene and polyfluorene, an ion conductive polymer material obtained by dispersing an ionic substance such as NaCl or $Cu(CF_3SO_3)_2$ in matrix resin of polyvinyl alcohol or polycarbonate, and a conductive oxide material such as an indium oxide (IO), an indium tin oxide (ITO), or a fluorine-doped tin oxide (FTO). One or two or more kinds of these materials can be used in combination.

The photoconductive film 520 is formed in a film shape and formed on the lower surface (a surface on the liquid crystal polymer composite layer 540 side) of the first electrode 511. The photoconductive film 520 has light transmission properties and is substantially colorless and transparent. Such a photoconductive film 520 only has to be a photoconductive film in which, when light is irradiated thereon, the impedance changes according to an amount of the light. It is possible to use a photoconductive film obtained by forming a film of a charge generating substance with the evaporation method, the sputtering method, the ion plating method, the CVD method, or the like, a photoconductive film obtained by dispersing the charge generating substance in a resin binder and applying the resin binder with the bar coat method, the spin coat method, the roll coat method, the dip method, the casting method, or the like, or a photoconductive film obtained by laminating a charge transport layer on a charge generating layer formed by any one of these method.

The charge generating substance is not specifically limited. For example, an inorganic material such as a-Si, ZnS, ZnO, CdS, CdSe, Se, SeTe, or TiO or an organic material such as a phthalocyanine material, an azo material, a polycyclic chinone material, an indigo material, a quinacridone material, a perylene material, a squarylium material, an azulenium material, a cyanine material, or a pyrylium material can be used.

The resin binder is not specifically limited. For example, polycarbonate, polyallylate, polyethylene, polypropylene, polyester, polyvinyl acetate, polyvinyl butyral, acryl, methacryl, vinyl chloride, vinyl acetate, a copolymer of these substances, or the like can be used. As the charge transport substance, an organic material such as a carbazol material, a triazole material, an oxadiazole material, an imidazole material, a pyrazoline material, a hydrazone material, a stilbene material, an amine material, or a nitrofluorenone material can be used.

The liquid crystal polymer composite layer 540 is in a state in which particles of a polymer 542 are dispersed and phase-separated in liquid crystal 541.

As the polymer 542, a polymer that is mutually dissolved with the liquid crystal 541 in a liquid crystal phase and, thereafter, when hardening, phase-separated from the liquid crystal 541 is used. As such a polymer 542, for example, a polymer of any kind can be used irrespective of whether the polymer is a thermoplastic polymer, a thermosetting polymer, or an ultraviolet curing polymer as long as the polymer is obtained attaching a side chain having a benzene skeleton or a biphenyl skeleton to a polymer main chain.

On the other hand, as the liquid crystal 541, liquid crystal having positive dielectric anisotropy oriented in a direction parallel to an electric field direction is used. As such liquid crystal 541, for example, phenylcyclohexane derivative liquid crystal, biphenyl derivative liquid crystal, biphenylcyclohexane derivative liquid crystal, terphenyl derivative liquid crystal, phenylether derivative liquid crystal, phenylester derivative liquid crystal, bicyclohexane derivative liquid crystal, azomethine derivative liquid crystal, azoxy derivative liquid crystal, pyrimidine derivative liquid crysal, dioxane derivative liquid crystal, cubane derivative liquid crystal, or the like can be used. As the liquid crystal 541, in order to improve the contrast of the screen 500, liquid crystal having as large diffractive index anisotropy Δn as possible may be used.

Orientation processing for orienting the liquid crystal 541 and the polymer 542 of the liquid crystal polymer composite layer 540 in a direction parallel to the first substrate 510 and the second substrate 560 is applied to the orientation films 530 and 550. Since the polymer 542 is in a liquid crystal phase when being oriented but, thereafter, is hardened, an orientation state thereof is fixed while being kept. Therefore, thereafter, even if an electric field is applied to the polymer 542, an orientation direction is not aligned with an electric field direction. On the other hand, since an orientation state of the liquid crystal 541 is not fixed, when an electric field is applied thereto, an orientation direction is aligned with the electric field direction.

Therefore, when the electric field is not applied to the liquid crystal polymer composite layer 540 (as explained later, the intensity of the electric field does not reach, for example, V1), the orientation directions of the polymer 542 and the liquid crystal 541 coincide with each other in the direction parallel to the first substrate 510 and the second substrate 560 (the liquid crystal 541 and the polymer 542 are aligned and orientated). When refractive indexes of the liquid crystal 541 and the polymer 542 are set the same in this state, the screen 500 changes to the transparent state (the light transmission state).

Conversely, when the electric field is applied to the liquid crystal polymer composite layer 540, the orientation direction of the liquid crystal 541 is aligned with the electric field direction (the liquid crystal 541 and the polymer 542 are orientated in different directions), in the electric field direction, a light scattering state occurs on an interface between the liquid crystal 541 and the polymer 542 because of inconsistency of the refractive indexes. The screen 500 changes to the opaque state (the light diffusion state).

With such a liquid crystal polymer composite layer 540, when voltage is not applied, the screen 500 is in the light transmission state in which the screen 500 is colorless and transparent. The screen 500 can be changed to the light diffusion state in which the screen 500 is opaque by applying voltage thereto. Therefore, it is possible to obtain the screen 500 suitable for a use of the image forming apparatus 100. Such switching of the light transmission state and the light diffusion state can be independently performed in respective regions of the display surface 500a.

The polymer 542 may be a polymer obtained by filling a polymer precursor in a liquid phase between the first substrate 510 and the second substrate 560 and, then, polymerizing the polymer precursor. In the liquid crystal polymer composite layer 540 in this embodiment, the particles of the polymer 542 are dispersed in the liquid crystal 541. However, particles of the liquid crystal 541 may be dispersed in the polymer 542.

An example of a method of manufacturing the screen 500 is explained below. The method of manufacturing the screen 500 is not limited to a method explained below.

First, the first electrode 511 is formed on the surface of the first substrate 510 and the second electrode 561 is formed on the surface of the second substrate 560. The first and second electrodes 511 and 561 can be formed by, for example, the evaporation method. Subsequently, the photoconductive film 520 is formed on the surface of the first electrode 511 by the method explained above. The orientation film 530 is formed on the surface of the photoconductive film 520 by spin-coating, for example, polyimide. The orientation film 550 is formed on the surface of the second electrode 561 by the same method. Thereafter, the first substrate 510 on which the orientation film 530 is formed and the second substrate 560 on which the orientation film 550 is formed are baked at 150° C. After the baking, rubbing processing (orientation processing) is applied to the surfaces of the orientation films 530 and 550. Rubbing directions in the rubbing processing are set such that, when the first substrate 510 and the second substrate 560 are combined, the rubbing directions are parallel to each other.

Subsequently, the first substrate 510 and the second substrate 560 are arranged such that the orientation films 530 and 550 are opposed to each other. The first substrate 510 and the second substrate 560 are fixed to have a space of, for example, 10 μm therebetween. A mixture obtained by mutually solving the polymer precursor and the liquid crystal 541 at a ratio of, for example, 1:10 is filled in the space. Paraphenyl phenol methacrylate ester can be used as the polymer precursor and PN001 (a product name, Lodic Co., Ltd.) can be used as the liquid crystal 541. The mixture of the polymer precursor and the liquid crystal 541 are gradually cooled, an ultraviolet ray is irradiated on the mixture at the room temperature to polymerize and harden the polymer precursor, and the liquid crystal 541 and the polymer 542 are phase-separated. In this way, the screen 500 is obtained.

The operation of the screen 500 is explained. For convenience of explanation, the screen 500 manufactured by the manufacturing method explained above is explained as an example.

The polymer 542 and the liquid crystal 541 shown in FIG. 2 show the same refractive index anisotropy. A refractive index in a direction parallel to the orientation direction is about 1.5 and a refractive index in a direction perpendicular to the orientation direction is about 1.7. In a state in which an electric field is not applied to the liquid crystal polymer composite layer 540, since the liquid crystal 541 is oriented in the same direction as the polymer 542, the refractive indexes of the liquid crystal 541 and the polymer 542 in the direction perpendicular to the first substrate 510 and the second substrate 560 coincide with each other. Therefore, in this state, the screen 500 changes to a substantially colorless and transparent state (the light transmission state) in which transmittance is about 80%.

On the other hand, when voltage is applied between the first electrode 511 and the second electrode 561 by the voltage applying unit 570 and an electric field is caused to act on the liquid crystal polymer composite layer 540, whereas the orientation direction of the polymer 542 does not change, only the liquid crystal 541 is oriented in an electric field direction, i.e., the direction perpendicular to the first substrate 510 and the second substrate 560. Therefore, in the electric field direction perpendicular to the first substrate 510 and the second substrate 560, whereas the refractive index of the polymer 542 remains at about 1.7, the refractive index of the liquid crystal 541 changes to about 1.5. Therefore, a difference between the refractive indexes of the polymer 542 and the liquid crystal 541 in the electric field direction is about 0.2. Light made incident from the direction perpendicular to the first substrate 510 and the second substrate 560 scatters. As a result, the screen 500 changes to the opaque state (the light diffusion state) in the electric field direction.

A relation between the transmittance of the screen 500 and the intensity of voltage applied to the liquid crystal polymer composite layer 540 is explained with reference to FIG. 3. As shown in FIG. 3, the screen 500 keeps high transmittance of about 80% and keeps the substantially colorless and transparent state until the intensity of the voltage applied to the liquid crystal polymer composite layer 540 exceeds V1. The transmittance steeply falls until the intensity of the voltage reaches V2 after exceeding V1. The transmittance falls to nearly zero when the intensity of the voltage exceeds V2. In this way, it is seen that, in the screen 500, the transmittance does not linearly fall with respect to the intensity of the voltage applied to the liquid crystal polymer composite layer 540 but steeply falls when the intensity of the voltage exceeds a predetermined voltage V1.

A relation between voltage applied between the first electrode 511 and the second electrode 561 by the voltage applying unit 570 and voltage actually applied to the liquid crystal polymer composite layer 540 is explained. FIG. 4 is a diagram showing an equivalent circuit of the screen 500. In FIG. 4, equivalent capacitances and equivalent resistances of components (e.g., the first electrode 511 and the second electrode 561) other than the liquid crystal polymer composite layer 540 and the photoconductive film 520 are ignored.

In FIG. 4, CA and RA represent the capacitance and the resistance of the liquid crystal polymer composite layer 540 and VA represents voltage actually applied to the liquid crystal polymer composite layer 540 when voltage V is applied between the first electrode 511 and the second electrode 561. In FIG. 4, CO and RO represent the capacitance and the resistance of the photoconductive film 520 and VO represents a voltage drop that occurs in the photoconductive film 520 when the voltage V is applied between the first electrode 511 and the second electrode 561.

The resistance RO changes according to a light amount of address light LL' irradiated from the projector 700. When the address light LL' is not irradiated (or the light amount is small), the resistance RO of the photoconductive film 520 is sufficiently large. The voltage VA actually applied to the liquid crystal polymer composite layer 540 is calculated as follows from capacitance divided voltage of the capacitances CA and CO.

$$VA = (C/CA)V \quad (1)$$

$$C = CA*CO/(CA*CO) \quad (2)$$

On the other hand, when the light amount of the address light LL' increases, the resistance RO of the photoconductive film 520 decreases because of an internal photoelectric effect and the voltage VA actually applied to the liquid crystal polymer composite layer 540 increases. In other words, in the image forming apparatus 100, in a state in which the voltage V is applied between the first electrode 511 and the second electrode 561, the light amount of the address light LL' irradiated from the projector 700 on the screen 500 is controlled, whereby the voltage VA actually applied to the liquid crystal polymer composite layer 540 can be controlled.

A method of using such a screen 500 is explained below.

First, voltage (alternating voltage) is applied between the first electrode 511 and the second electrode 561 by the voltage applying unit 570 (this state is hereinafter referred to as "standby state"). The intensity of the applied voltage may be intensity at which voltage actually applied to the liquid crystal polymer composite layer 540 is slightly lower than or equal to V1. This makes it possible to keep the screen 500 substantially colorless and transparent in the standby state and change the screen 500 to the light diffusion state by slightly increasing the voltage from the standby state. In this embodiment, the intensity of voltage applied between the first electrode 511 and the second electrode 561 is determined such that the transmittance of the screen 500 in the standby state is about 80%. However, the transmittance of the screen 500 in the standby state is not specifically limited and may be set to, for example, about 70%. This only has to be appropriately set according to transmittance required in the standby state of the screen 500.

Subsequently, the address light LL' is irradiated from the projector 700 on a desired region (a very small area) of the display surface 500a of the screen 500 in the standby state. Then, in the region where the address light LL' is irradiated, the electric resistance of the photoconductive film 520 falls because of the irradiation of the address light LL' and actual voltage applied to the liquid crystal polymer composite layer 540 rises. Consequently, the transmittance of this region falls and the screen 500 becomes opaque and changes to the light diffusion state. On the other hand, in a region where the address light LL' is not irradiated, the colorless and transparent state is maintained because the intensity of the voltage applied to the liquid crystal polymer composite layer 540 does not change. The region in the opaque state is formed to correspond to an image displayed on the display surface 500a, i.e., formed in an area where the image is displayed, whereby, for example, as shown in FIG. 5, alight diffusion area (an area actually functioning as a screen) 500b along a contour of the image is formed on the display surface 500a.

The light amount of the address light LL' irradiated on the display surface 500a is not specifically limited as long as the transmittance of the region where the address light LL' is irradiated can be reduced. The light amount of the address light LL' may be a light amount at which the transmittance of the screen 500 is equal to or lower than 20% or may be a light amount at which the transmittance of the screen 500 is equal to or lower than 5%. This makes it possible to form a light diffusion area having excellent light diffusion properties.

In this way, the screen 500 is used to be colorless and transparent in the standby state and change to the light diffusion state only in an area where an image is displayed. This makes it possible to show an excellent advertisement effect as explained above.

The screen 500 is explained above in detail.

Projector 700

As shown in FIG. 6, the projector 700 includes a light emitting unit (a light source unit) 200 that emits the laser beam LL, a light scanning unit 300 that reflects the laser beam LL emitted from the light source unit 200 and scans the laser beam LL on the display surface 500a of the screen 500, and a control unit 400 that controls the actuation of the light source unit 200 and the light scanning unit 300. The light source unit 200 includes a light source for address light 200a that emits, such that a desired image can be displayed on the display surface 500a, the address light LL' for changing an area of the display surface 500a corresponding to the image to the light diffusion state and a light source for display light 200b that emits display light LL" for displaying an image on the display surface 500a.

Such a projector 700 scans the address light LL' on the display surface 500a and scans the display light LL" in an area changed to the light diffusion state by the irradiation of the address light LL' to thereby display a desired image on the display surface 500a. This makes it possible to substantially simultaneously perform, with one projector 700, a step of forming a light diffusion area on the display surface 500a and a step of forming an image in the light diffusion area 500b. Therefore, the configuration of the image forming apparatus 100 is simplified and efficiency of image display is improved.

The light source for address light 200a includes a laser beam source 210i that emits an infrared laser as the address light LL' and a collimator lens 220i and a dichroic mirror 230i provided to correspond to the laser beam source 210i. The address light LL' emitted from the laser beam source 210i is parallelized to be changed to a thin beam by the collimator lens 220i and, then, reflected by the dichroic mirror 230i. The reflected address light LL' is combined with (superimposed on) the display light LL" and emitted from the light source unit 200 as the laser beam LL.

By using the infrared layer as the address light LL' in this way, it is possible to prevent the address light LL' from being visually recognized by the observer, prevent the address light LL' from affecting a hue or the like of an image displayed on the display surface 500a, and display a desired image on the display surface 500a.

In the light source for address light 200a, a collimator mirror can be used instead of the collimator lens 220i. In this case, a thin beam of parallel light beams can also be formed. When the parallel light beams are emitted from the laser beam source 210i, the collimator lens 220i can be omitted.

On the other hand, the light source for display light 200b includes laser beam sources 210r, 210g, and 210b for respective colors and collimator lenses 220r, 220g, and 220b and dichroic mirrors 230r, 230g, and 230b provided to correspond to the laser beam sources 210r, 210g, and 210b for the respective colors. The laser beam sources 210r, 210g, and 210b for the respective colors respectively emit laser beams RR, GG, and BB of red, green, and blue. The laser beams RR, GG, and BB are emitted while being modulated to correspond to a driving signal transmitted from the control unit 400 and are parallelized by the collimator lenses 220r, 220g, and 220b to be changed to a thin beam.

The dichroic mirrors 230r, 230g, and 230b respectively have characteristics for reflecting the red laser beam RR, the green laser beam GG, and the blue laser beam BB. The dichroic mirrors 230r, 230g, and 230b combine the laser beams RR, GG, and BB of the respective colors and emit one display light (laser beam) LL". As explained above, the display light LL" is combined with the address light LL' and emitted from the light source unit 200 as the laser beam LL.

Collimator mirrors can be used instead of the collimator lenses 220r, 220g, and 220b. In this case, a thin beam of parallel light beams can also be formed. When parallel light beams are emitted from the laser beam sources 210r, 210g, and 210b for the respective colors, the collimator lenses 220r, 220g, and 220b can be omitted. The laser beam sources 210r, 210g, and 210b can be replaced with light sources such as light emission diodes that generate the same light beams. The order of the laser beam sources 210r, 210g, and 210b, the collimator lenses 220r, 220g, and 220b, and the dichroic mirrors 230r, 230g, and 230b for the respective colors shown in FIG. 6 is only an example. The order can be freely set while the combination of the respective colors (red is for the laser beam source 210r, the collimator lens 220r, and the dichroic mirror 230r, green is for the laser beam source 210g, the collimator lens 220g, and the dichroic mirror 230g, and blue is for the laser beam source 210b, the collimator lens 220b, and the dichroic mirror 230b). For example, a combination of blue, red, and green in order from one closest to an optical scanner 310 is also possible.

The light scanning unit 300 has a function of scanning the laser beam LL emitted from the light source unit 200 on the display surface 500a of the screen 500. The laser beam LL is a laser beam obtained by combining the display light LL" as a laser beam for image display and the address light LL' as a laser beam for changing a desired area of the display surface 500a to the light diffusion state. Therefore, the display light LL" and the address light LL' can be simultaneously irradiated on the same region of the display surface 500a by the light scanning unit 300. This makes it possible to surely irradiate the display light LL" on a region changed to the light diffusion state and display a desired image on the screen 500.

Such a light scanning unit 300 includes the optical scanner 310 as a mirror for horizontal scanning that scans the laser beam LL emitted from the light source unit 200 on the display surface 500a in the horizontal direction (an x direction), an angle detecting unit 320 that detects an angle (behavior) of a movable plate 311a of the optical scanner 310, an optical scanner 330 as a mirror for vertical scanning that scans the laser beam LL emitted from the light source unit 200 on the display surface 500a in the vertical direction (a y direction), and an angle detecting unit 340 that detects an angle (behavior) of a movable plate 331a of the optical scanner 330. With such a configuration, the configuration of the optical scanning unit 300 is simplified.

The configuration of the optical scanners 310 and 330 is explained below. However, since the optical scanners 310 and 330 have the same configuration, the optical scanner 310 is representatively explained below and explanation of the optical scanner 330 is omitted.

As shown in FIG. 7, the optical scanner 310 is a so-called single-degree-of-freedom oscillation system and includes a substrate 311, an opposed substrate 313 provided to be opposed to the lower surface of the substrate 311, and a spacer member 312 provided between the substrate 311 and the opposed substrate 313.

The substrate 311 includes the movable plate 311a, a supporting section 311b that pivotably supports the movable plate 311a, and a pair of coupling sections 311c and 311d that couple the movable plate 311a and the supporting section 311b.

The movable plate 311a is formed in a substantially rectangular shape in plan view thereof. A light reflecting section 311e having light reflection properties is provided on the upper surface of such a movable plate 311a. The surface of the light reflecting section 311e forms a reflection surface that reflects light. The light reflecting section 311e is formed of a metal film of Al, Ni, or the like. A permanent magnet 314 is provided on the lower surface of the movable plate 311a.

The supporting section 311b is provided to surround the outer periphery of the movable plate 311a in plan view of the movable plate 311a. In other words, the supporting section 311b is formed in a frame shape and the movable plate 311a is located on the inner side of the supporting section 311b.

The coupling section 311c couples the movable plate 311a and the supporting section 311b on the left side of the movable plate 311a. The coupling section 311d couples the movable plate 311a and the supporting section 311b on the right side of the movable plate 311a. The coupling sections 311c and 311d are formed in a longitudinal shape. The coupling sections 311c and 311d are elastically deformable. The pair of coupling sections 311c and 311d are provided coaxially with each other. The movable plate 311a pivots with respect to the supporting section 311b around this axis (hereinafter referred to as "pivoting center axis J1").

Such a substrate 311 is formed of, for example, silicon as a main material. The movable plate 311a, the supporting section 311b, and the coupling sections 311c and 311d are integrally formed. Since the silicon is the main material, it is possible to realize an excellent pivoting characteristic and show excellent durability. Further, it is possible to perform micro processing (machining) and realize a reduction in size of the optical scanner 310.

The spacer member 312 is formed in a frame shape. The upper surface of the spacer member 312 is joined with the lower surface of the substrate 311. The shape of the spacer member 312 is substantially the same as the shape of the supporting section 311b in plan view of the movable plate 311a. Such a spacer member 312 is formed of, for example, any one of various kinds of glass, anyone of various kinds of ceramics, silicon, or $SiO_2$.

A method of joining the spacer member 312 and the substrate 311 is not specifically limited. For example, the spacer member 312 and the substrate 311 may be joined via another member such as an adhesive. Depending on a material forming the spacer member 312, anode joining or the like may be used.

Like the spacer member 312, the opposed substrate 313 is formed of, for example, any one of various kinds of glass, silicon, or $SiO_2$. A coil 315 is provided in a region opposed to the movable plate 311a on the upper surface of the counter substrate 313.

The permanent magnet 314 is formed in a plate bar shape and provided along the lower surface of the movable plate 311a. Such a permanent magnet 314 is magnetized (polarized) in a direction orthogonal to the pivoting center axis J1 in plan view of the movable plate 311a. In other words, the permanent magnet 314 is provided such that both poles thereof are opposed to each other via the pivoting center axis J1.

Such a permanent magnet 314 is not specifically limited. For example, a neodium magnet, a ferrite magnet, a samarium cobalt magnet, an Alnico magnet, or the like can be used.

The coil 315 is provided to surround the outer periphery of the permanent magnet 314 in plan view of the movable plate 311a.

As shown in FIGS. 8A and 8B, the optical scanner 310 includes a voltage applying unit 316 that applies voltage to the coil 315. The voltage applying unit 316 can adjust (change) conditions such as a voltage value and a frequency of voltage to be applied. The voltage applying unit 316, the coil 315, and the permanent magnet 314 configure a driving unit 317 that pivots the movable plate 311a.

Predetermined voltage is applied to the coil 315 from the voltage applying unit 316 according to the control by the control unit 400 and predetermined electric current flows to the coil 315. For example, when alternating voltage is applied to the coil 315 from the voltage applying unit 316 according to the control by the control unit 400, electric current flows according to the application of the alternating voltage, a magnetic field in the thickness direction of the movable plate 311a is generated, and the direction of the magnetic field is periodically switched. Specifically, a state A in which a section near the upper side of the coil 315 is the S pole and a section near the lower side thereof is the N pole and a state B in which the section near the upper side of the coil 315 is the N pole and the section near the lower side thereof is the S pole are alternately switched.

In the state A, as shown in FIG. 8A, the right side of the permanent magnet 314 is displaced to the upper side by repulsion to a magnetic field generated by energization to the coil 315 and the left side of the permanent magnet 314 is displaced to the lower side by attraction to the magnetic field. According to the displacement, the movable plate 311a pivots counterclockwise and tilts. Conversely, in the state B, as shown in FIG. 8B, the right side of the permanent magnet 314 is displaced to the lower side and the left side of the permanent magnet 314 is displaced to the upper side. According to the displacement, the movable plate 311a pivots clockwise and tilts.

Such states A and B are alternately repeated, whereby the movable plate 311a pivots (oscillates) around the pivoting center axis J1 while torsionally deforming the coupling sections 311c and 311d.

The voltage applied from the voltage applying unit 316 to the coil 315 is adjusted according to the control by the control unit 400, whereby the flowing electric current can be adjusted. This makes it possible to adjust a deflecting angle (amplitude) around the pivoting center axis J1 of the movable plate 311a (a reflection surface of the light reflecting section 311e).

The configuration of such an optical scanner 310 is not specifically limited as long as the movable plate 311a can be pivoted. For example, a driving system may be, for example, piezoelectric driving employing a piezoelectric element or electrostatic driving employing electrostatic attraction instead of electromagnetic driving employing the coil 315 and the permanent magnet 314.

As shown in FIG. 6, the optical scanners 310 and 330 having the configuration explained above are provided such that pivoting center axes J1 and J2 thereof are orthogonal to each other. Since the optical scanners 310 and 330 are provided in this way, the laser beam LL emitted from the light source unit 200 can be two-dimensionally scanned on the display surface 500a. This makes it possible to change, with a relatively simple configuration, a desired area of the display surface 500a to the light diffusion state and render a desired two-dimensional image on the display surface 500a.

Specifically, the laser beam LL emitted from the light source unit 200 is reflected on the reflection surface of the light reflecting section 311e of the optical scanner 310, subsequently reflected on the reflection surface of the light reflecting section 331e of the optical scanner 330, and irradiated on the display surface 500a of the screen 500. The light reflecting section 311e of the optical scanner 310 is pivoted and the light reflecting section 311e of the optical scanner 330 is pivoted at angular velocity lower than angular velocity (speed) of the light reflecting section 311e, whereby the laser beam LL emitted from the light source unit 200 is scanned on the display surface 500a in the horizontal direction and scanned in the vertical direction at scanning speed lower than scanning speed in the horizontal direction. Consequently, the laser beam LL emitted from the light source unit 200 is two-dimensionally scanned (raster scanning) on the display surface 500a. As a result, a region of the display surface 500a where the address light LL' included in the laser beam LL is irradiated changes from the light transmission state to the light diffusion state. The display light LL" included in the laser beam LL is irradiated on the area changed to the light diffusion state and a desired image is rendered on the display surface 500a.

In order to pivot the light reflecting section 331e of the optical scanner 330 at angular velocity lower than the angular velocity of the light reflecting section 311e of the optical scanner 310, for example, the optical scanner 310 may be resonant-driven using resonance and the optical scanner 330 may be non-resonant-driven without using resonance.

The angle detecting units 320 and 340 are explained below. The angle detecting units 320 and 340 having the same configuration. Therefore, in the following explanation, the angle detecting unit 320 is representatively explained and explanation of the angle detecting unit 340 is omitted.

As shown in FIG. 7, the angle detecting unit 320 includes a piezoelectric element 321 provided on the coupling section 311c of the optical scanner 310, an electromotive-force detecting section 322 that detects electromotive force generated from the piezoelectric element 321, and an angle detecting section 323 that calculates an angle of the movable plate 311a (detects behavior of the movable plate 311a) on the basis of a detection result of the electromotive-force detecting section 322.

When the coupling section 311c is torsionally deformed according to the pivoting of the movable plate 311a, the piezoelectric element 321 is deformed according to the torsional deformation. The piezoelectric element 321 has a characteristic that, when the piezoelectric element 321 is deformed from a natural state in which external force is not applied thereto, the piezoelectric element 321 generates electromotive force having magnitude corresponding to an amount of the deformation. Therefore, the angle detecting section 323 calculates a degree of torsion of the coupling section 311c on the basis of the magnitude of the electromotive force detected by the electromotive-force detecting section 322 and further calculates an angle of the movable plate 311a from the degree of torsion. The angle detecting section 323 calculates a deflecting angle around the pivoting center axis J1 of the movable plate 311a. A signal including information concerning the angle and the deflecting angle of the movable plate 311a is transmitted from the angle detecting section 323 to the control unit 400.

The angle of the movable plate 311a to be detected may be set with reference to anyone of the states of the optical scanner 310 (an angle is 0°). For example, the angle of the movable plate 311a can be set with reference to an initial state of the optical scanner 310 (a state in which voltage is not applied to the coil 315) (an angle is 0°). The detection of the angle of the movable plate 311a may be performed on a real time basis or may be performed intermittently. The angle detecting unit 320 is not limited to the angle detecting unit including the piezoelectric element as in this embodiment as long as the angle of the movable plate 311a can be detected. For example, the angle detecting unit 320 may include a photodiode.

The control unit 400 is explained below. The control unit 400 determines an area of the display surface 500a changed to the light diffusion state from image data transmitted from a not-shown computer or the like and displayed on the display surface 500a of the screen 500. The control unit 400 controls the actuation of the light source unit 200 and the light scanning unit 300 such that the address light LL' is irradiated on the determined area and the display light LL" is irradiated on the area changed to the light diffusion state by the irradiation of the address light LL'. This makes it possible to more surely change only an area of the display surface 500a where a user desires to display an image to the light diffusion state and display a desired image on the display surface 500a.

Specifically, first, image data is input to the control unit 400. Subsequently, the control unit 400 calculates an area (regions) of the display surface 500a where the display light LL" is irradiated when the input image data is displayed on the display surface 500a. Subsequently, the control unit 400 drives the optical scanners 310 and 330 and emits the address light LL' from the light source for address light 200a to correspond to (in synchronization with) the behavior of the movable plates 311a and 331a transmitted from the angle detecting units 320 and 340 such that the address light LL' is irradiated on the calculated area.

At the same time, the control unit 400 determines, on the basis of the input image data, a color and alight amount of the display light LL" to be irradiated concerning the regions of the area of the display surface 500a where the display light LL" is irradiated. The control unit 400 emits, on the basis of the determined color information, the display light LL" from the light source for display light 200b to correspond to (in synchronization with) the behavior of the movable plates 311a and 331a. Consequently, the laser beam LL obtained by combining the address light LL' and the display light LL" is irradiated on regions of the area of the display surface 500a where an image is displayed.

When the laser beam LL is irradiated on the regions of the area of the display surface 500a where an image is displayed, the region where the laser beam LL is irradiated is changed from the transparent state to the light diffusion state by the address light LL' included in the laser beam LL. Since the display light LL" included in the laser beam LL is irradiated on the region changed to the light diffusion state, the irradiated display light LL" is reflected and diffused and a desired color is displayed. This is performed in the regions of the area of the display surface 500a where an image is displayed, whereby, for example, an image shown in FIG. 9 can be displayed on the display surface 500a.

Since the screen 500 does not have memory properties, the region changed to the light diffusion state from the light transmission state by the irradiation of the address light LL' returns to the light transmission state when the irradiation of the address light LL' is stopped. Therefore, for example, if the image displayed on the display surface 500a is a still image, the still image may be continued to be rendered at relatively high speed such as about 60 frames/second. This makes it possible to display a still image without flicker due to an after-image on the display surface 500*a*. If the image displayed on the display surface 500*a* is a moving image, when an nth frame is finished being rendered and the next frame is rendered, an image of the preceding frame is erased from the screen 500. Therefore, a reset step for, for example, temporarily returning the entire area of the display surface 500*a* to the light transmission state is unnecessary. Time from the end of the rendering of the nth frame to the start of rendering of an n+1th frame may be more equal to time for return from the light diffusion state to the light transmission state due to the stop of the irradiation of the address light LL'. This makes it possible to display a moving image in which frames satisfactorily continue.

The projector 700 is explained in detail above.

When the deflecting angle of the movable plate 311*a* of the optical scanner 310 is fixed, the amplitude of the laser beam LL in a light emission state changes according to an angle of the movable plate 331*a* of the optical scanner 330. The amplitude of the laser beam LL is larger as a position in the vertical direction on the display surface 500*a* on which the laser beam LL is scanned is farther away from the projector 700. Therefore, in the projector 700, the deflecting angle of the movable plate 311*a* may be adjusted according to the angle of the movable plate 331*a*. Specifically, the deflecting angle of the movable plate 311*a* is set smaller as the position in the vertical direction on the display surface 500*a* is farther away from the projector 700, whereby the amplitude of the laser beam LL in the light emission state is fixed along the vertical direction. By performing such correction, it is possible to correct so-called "keystone distortion". It is possible to fix the amplitude of the movable plate 311*a* by, for example, controlling the magnitude of alternating voltage applied to the coil 315.

The projector 700 may perform control explained below using the adjustment of the amplitude of the laser beam LL in the light emission state. The projector 700 (the control unit 400) may change the deflecting angles of the movable plates 311*a* and 331*a* on the basis of a contour (an external shape) of an image displayed on the display surface 500*a*. Specifically, when the contour of the image displayed on the display surface 500*a* has a shape shown in FIG. 10, the projector 700 controls the deflecting angle of the movable plate 331*a* such that the amplitude in the vertical direction of the laser beam LL coincides with or is slightly larger than the width in the vertical direction of the contour in positions in the horizontal direction of the display surface 500*a*. At the same time, the projector 700 controls the deflecting angle of the movable plate 311*a* such that the amplitude in the horizontal direction of the laser beam LL coincides with or is slightly larger than the width in the horizontal direction of the contour in positions in the vertical direction of the display surface 500*a*. With such control, compared with a case in which the control is not performed, it is possible to efficiently scan a laser beam on the display surface 500*a* and time required for displaying the same image on the display surface 500*a* is reduced. This makes it possible to display a clearer image on the display surface 500*a*.

Second Embodiment

An image forming apparatus according to a second embodiment of the invention is explained below.

Figure 11:
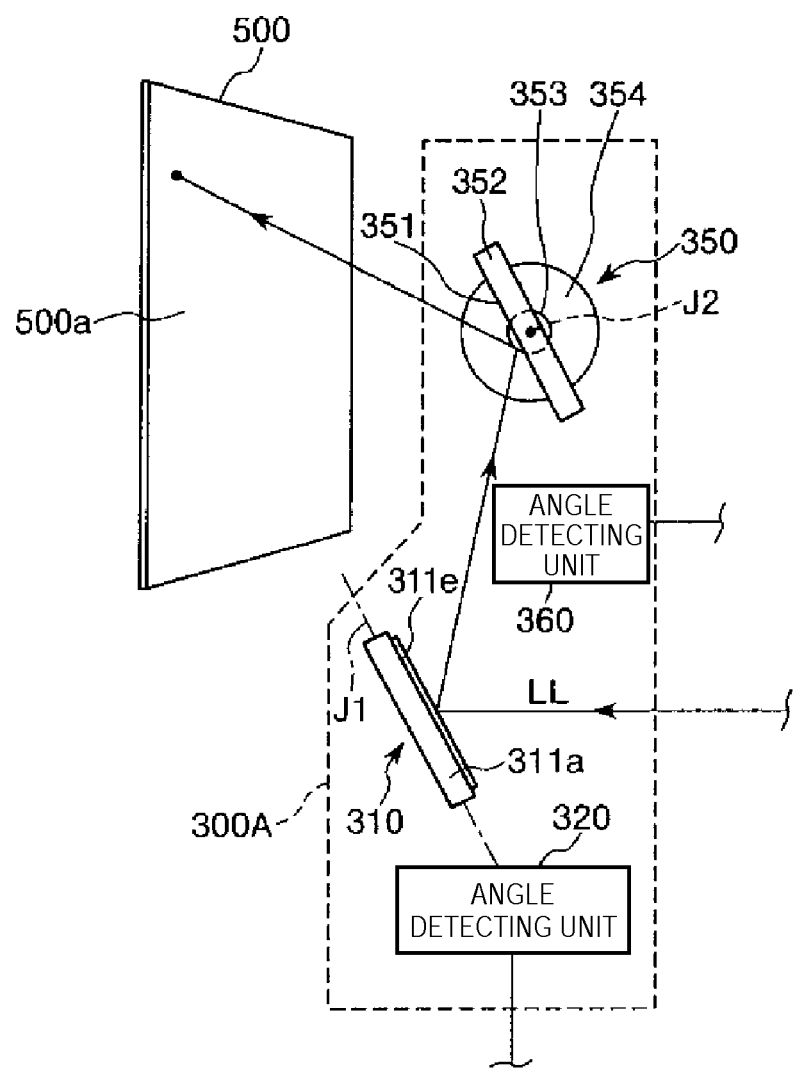
FIG. 11 is a schematic diagram showing the configuration of a light scanning unit of an image forming apparatus according to a second embodiment of the invention.

FIG. 11 is a schematic diagram showing the configuration of a light scanning unit of the image forming apparatus according to the second embodiment of the invention.

Concerning the image forming apparatus according to the second embodiment, differences from the first embodiment are mainly explained below. Explanation of similarities is omitted.

The image forming apparatus according to the second embodiment is substantially the same as the image forming apparatus according to the first embodiment except that the configuration of the light scanning unit is different and, specifically, one optical scanner of the pair of optical scanners is replaced with a galvanometer mirror. In FIG. 11, components same as those in the first embodiment are denoted by the same reference numerals and signs.

As shown in FIG. 11, a light scanning unit 300A includes the optical scanner 310, the angle detecting unit 320, a galvanometer mirror 350 as a mirror for vertical scanning that scans the laser beam LL emitted from the light source unit 200 on the display surface 500*a* in the vertical direction, and an angle detecting unit 360 that detects an angle (behavior) of a reflection surface 351 of the galvanometer mirror 350.

The galvanometer mirror 350 includes a motor 354 having a rotating shaft 353 and a mirror unit 352 fixed to the rotating shaft 353. The reflection surface 351 is provided on the mirror unit 352. Such a galvanometer mirror 350 drives the motor 354 to pivot the reflection surface 351 around the rotating shaft 353 to thereby scan the laser beam LL in the vertical direction.

For example, the angle detecting unit 360 detects an angle of the reflection surface 351 on the basis of a rotation angle of the rotating shaft 353.

According to such a second embodiment, it is possible to realize effects same as those in the first embodiment.

Third Embodiment

An image forming apparatus according to a third embodiment of the invention is explained below.

Figure 12:
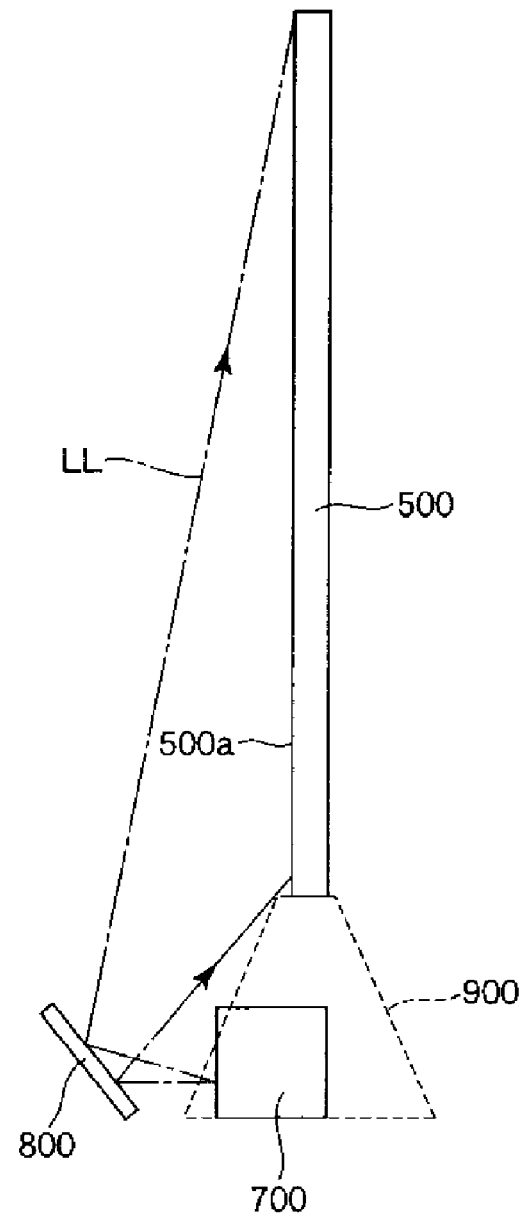
FIG. 12 is a schematic diagram showing the configuration of an image forming apparatus according to a third embodiment of the invention.

FIG. 12 is a schematic diagram showing the configuration of the image forming apparatus according to the third embodiment of the invention.

Concerning the image forming apparatus according to the third embodiment, differences from the first embodiment are mainly explained below. Explanation of similarities is omitted.

The image forming apparatus according to the third embodiment is substantially the same as the image forming apparatus according to the first embodiment except that the image forming apparatus according to the third embodiment includes a reflection mirror. In FIG. 12, components same as those in the first embodiment are denoted by the same reference numerals and signs.

As shown in FIG. 12, the image forming apparatus 100 includes the screen 500, the projector 700, and a reflection mirror 800. A relative positional relation among these components is fixed.

In such an image forming apparatus 100, the laser beam LL emitted from the projector 700 is reflected by the reflection mirror 800 and, then, scanned on the display surface 500*a* of the screen 500. Since the laser beam LL is once reflected on the reflection mirror 800 in this way, optical path length of the laser beam LL can be extended and an area where the laser beam LL can be scanned is increased. Such a configuration is particularly effective when the projector 700 is provided near the screen 500.

The reflection mirror 800 is not arranged in an area formed by extending the contour of the screen 500 in a direction orthogonal to the display surface 500*a*. This makes it possible to effectively prevent observation of an image displayed on the display surface 500a from being disturbed by the reflection mirror 800. Therefore, the observer can easily observe the image displayed on the display surface 500a. It is possible to show an excellent advertisement function.

According to such a third embodiment, it is possible to realize effects same as those in the first embodiment.

Fourth Embodiment

An image forming apparatus according to a fourth embodiment of the invention is explained below.

Figure 13:
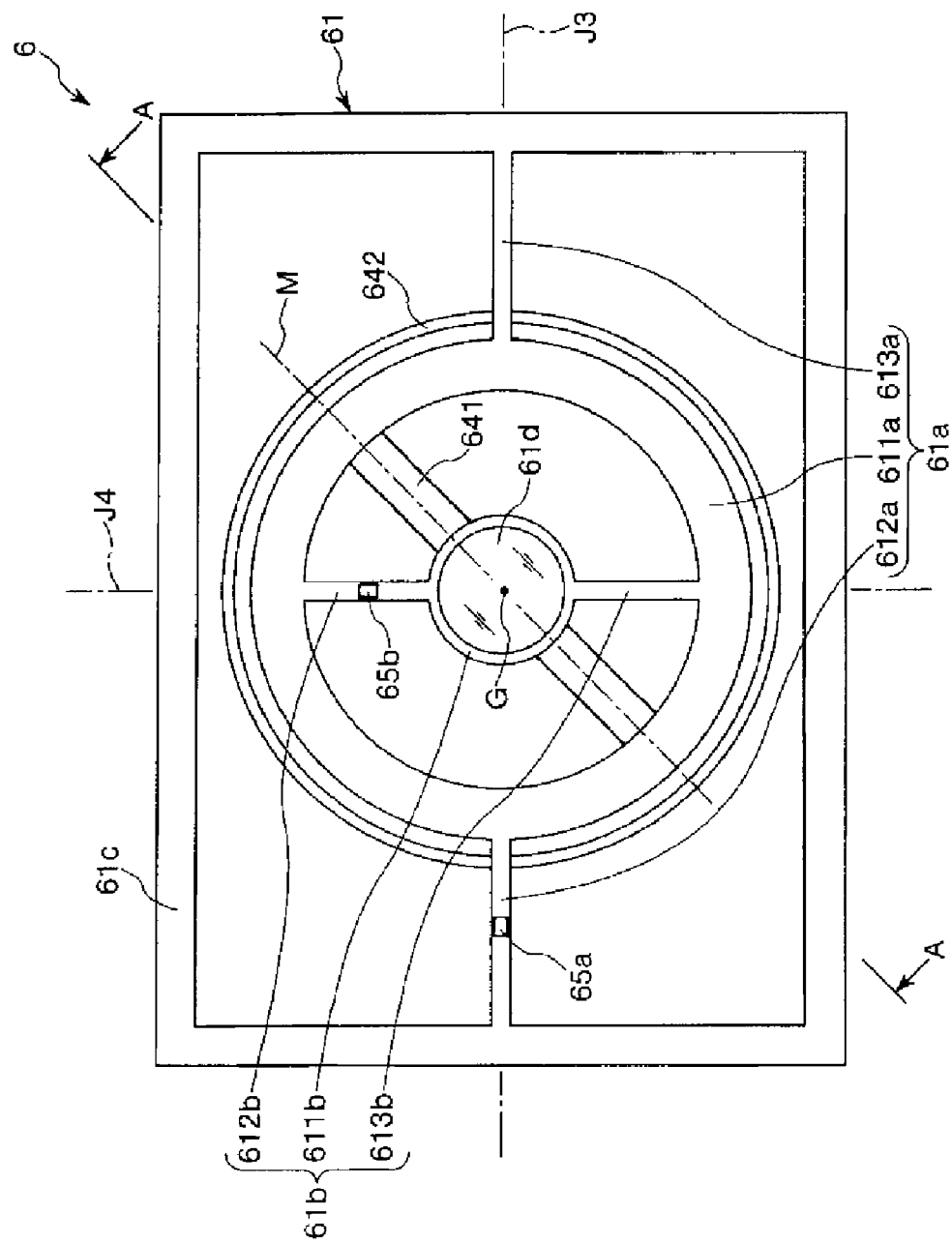
FIG. 13 is a plan view of an optical scanner of a projector included in an image forming apparatus according to a fourth embodiment of the invention.
Figure 14:
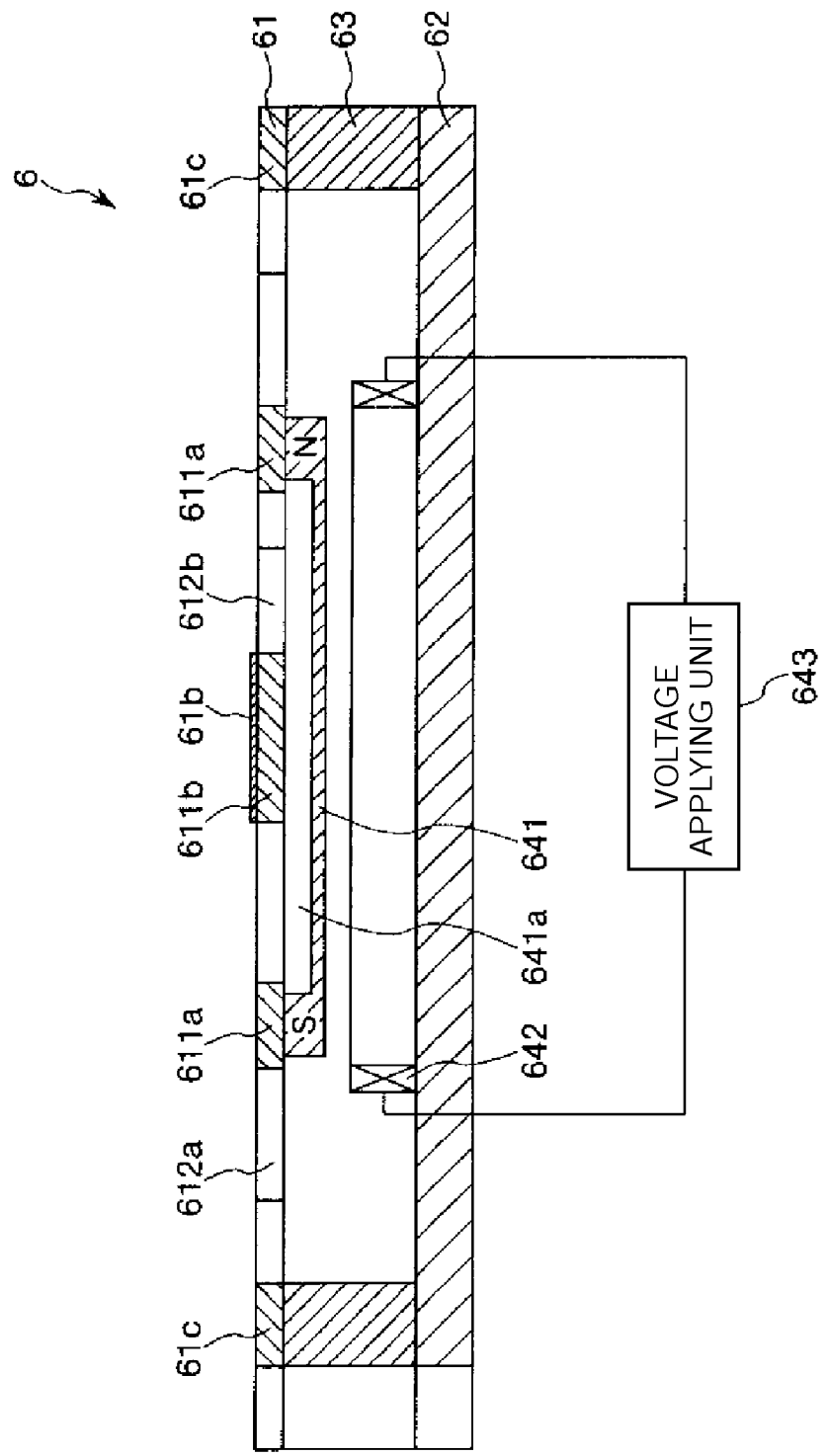
FIG. 14 is a sectional view taken along line A-A in FIG. 13.
Figure 15:
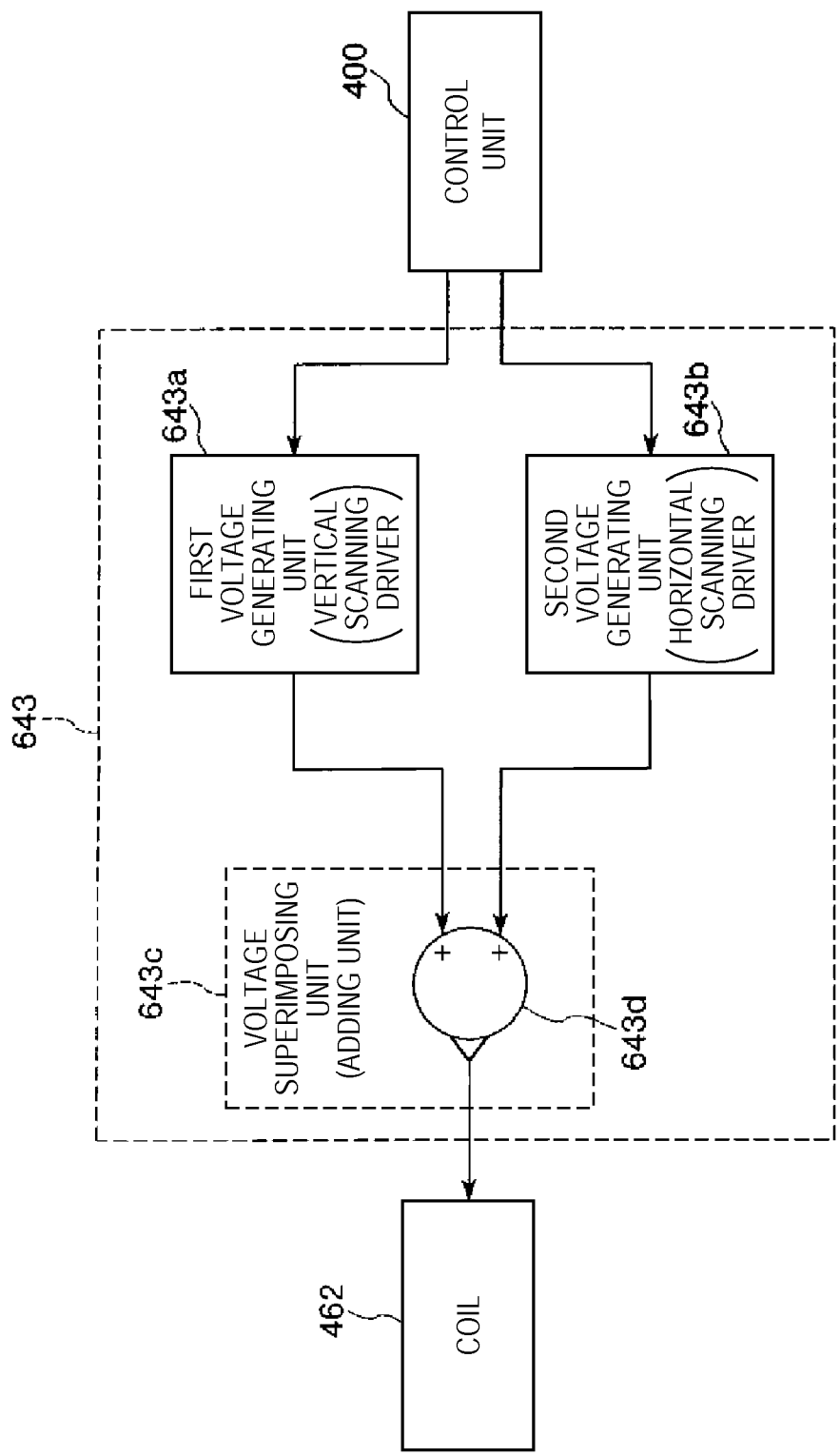
FIG. 15 is a block diagram showing a voltage applying unit of a driving unit included in the optical scanner shown in FIG. 13.
Figure 16A:
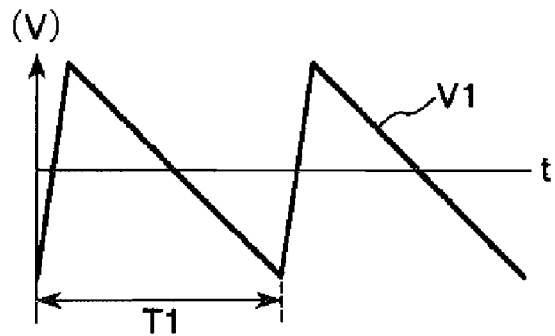
FIGS. 16A and 16B are diagrams showing examples of voltages generated in a first voltage generating unit and a second voltage generating unit shown in FIG. 15.
Figure 16B:
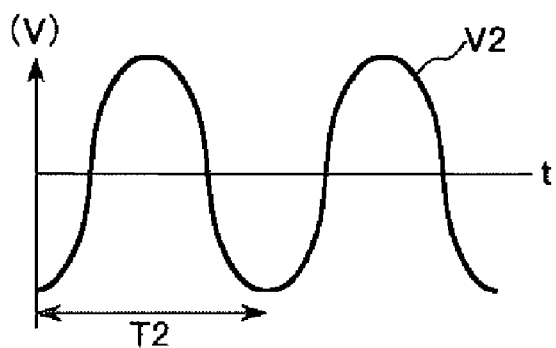

FIG. 13 is a plan view of an optical scanner of a projector included in the image forming apparatus according to the fourth embodiment of the invention. FIG. 14 is a sectional view taken along line A-A in FIG. 13. FIG. 15 is a block diagram showing a voltage applying unit of a driving unit included in the optical scanner shown in FIG. 13. FIGS. 16A and 16B are diagrams showing examples of voltages generated in a first voltage generating unit and a second voltage generating unit shown in FIG. 15. In the following explanation, for convenience of explanation, a front side on the paper surface, a depth side on the paper surface, a right side, and a left side in FIG. 13 are respectively referred to as "upper", "lower", "right", and "left". An upper side, a lower side, a right side, and a left side in FIG. 14 are respectively referred to as "upper", "lower", "right", and "left".

Concerning the image forming apparatus according to the fourth embodiment, differences from the first embodiment are mainly explained below. Explanation of similarities is omitted.

The image forming apparatus according to the fourth embodiment is substantially the same as the image forming apparatus according to the first embodiment except that the configuration of an optical scanner included in a projector is different. In FIG. 15, components same as those in the embodiments explained above are denoted by the same reference numerals and signs.

The light scanning unit 300 includes one optical scanner 6 of a so-called two-degree-of-freedom oscillation system.

The optical scanner 6 includes a substrate 61 including a first oscillation system 61a, a second oscillation system 61b, and a supporting section 61c shown in FIG. 13, an opposed substrate 62 arranged to be opposed to the substrate 61, a spacer member 63 provided between the substrate 61 and the opposed substrate 62, a permanent magnet 641, and a coil 642.

The first oscillation system 61a includes a frame-like driving section 611a provided on the inner side of the frame-like supporting section 61c and a pair of first coupling sections 612a and 613a that support the driving section 611a at both ends thereof in the center of the supporting section 61c. The other second oscillation system 61b includes a movable plate 611b provided on the inner side of the driving section 611a and a pair of second coupling sections 612b and 613b that support the movable plate 611b at both ends thereof in the center of the driving section 611a.

The driving section 611a is formed in an annular shape in plan view of FIG. 13. The shape of the driving section 611a is not specifically limited as long as the driving section 611a is frame-like. For example, the driving section 611a may be formed in a square annular shape in plan view of FIG. 13. A permanent magnet 641 is joined to the lower surface of such a driving section 611a.

The first coupling sections 612a and 613a are formed in a longitudinal shape and are elastically deformable. The first coupling sections 612a and 613a couple the driving section 611a and the supporting section 61c to make the driving section 611a pivotable with respect to the supporting section 61c. The first coupling sections 612a and 613a are provided coaxially with each other. The driving section 611a pivots with respect to the supporting section 61c around this axis (hereinafter referred to as "pivoting center axis J3").

The first coupling section 612a includes a piezoelectric element 65a for detecting an angle of the driving section 611a (a pivoting angle around the pivoting center axis J3).

The movable plate 611b is formed in a circular shape in plan view of FIG. 13. The shape of the movable plate 611b is not specifically limited as long as the movable plate 611b can be formed on the inner side of the driving section 611a. For example, the movable plate 611b may be formed in an elliptical shape or may be formed in a square shape in plan view of FIG. 13. A light reflecting section 61d having light reflection properties is formed on the upper surface of such a movable plate 611b.

The second coupling sections 612b and 613b are formed in a longitudinal shape and are elastically deformable. The second coupling sections 612b and 613b respectively couple the movable plate 611b and the driving section 611a to make the movable plate 611b pivotable with respect to the driving section 611a. The second coupling sections 612b and 613b are provided coaxially with each other. The movable plate 611b pivots with respect to the driving section 611a around this axis (hereinafter referred to as "pivoting center axis J4").

The second coupling section 612b includes a piezoelectric element 65b for detecting an angle of the movable plate 611b (a pivoting angle around the pivoting center axis J4).

As shown in FIG. 13, the pivoting center axis J3 and the pivoting center axis J4 are orthogonal to each other. The centers of the driving section 611a and the movable plate 611b are located on an intersection of the pivoting center axes J3 and J4 in plan view of FIG. 13. For convenience of explanation, the intersection of the pivoting center axes J3 and J4 is also referred to as "intersection G".

As shown in FIG. 14, the substrate 61 explained above is joined to the opposed substrate 62 via the spacer member 63. The coil 642 that generates a magnetic field acting on the permanent magnet 641 is provided on the upper surface of the opposed substrate 62.

The permanent magnet 641 is provided along a segment (which is also referred to as "segment M") passing through the intersection G and inclined with respect to each of the pivoting center axis J3 and the pivoting center axis J4 in plan view of FIG. 13. In such a permanent magnet 641, one side in a longitudinal direction with respect to the intersection G is the S pole and the other side is the N pole. In FIG. 14, the left side in the longitudinal direction of the permanent magnet 641 is the S pole and the right side is the N pole.

An inclination angle θ of the segment M with respect to the pivoting center axis J3 may be 30 degrees to 60 degrees, may be 40 degrees to 50 degrees, or may be about 45 degrees in plan view of FIG. 13. Since the permanent magnet 641 is provided in this way, it is possible to smoothly pivot the movable plate 611b around each of the pivoting center axis J3 and the pivoting center axis J4. In this embodiment, the segment M is inclined about 45 degrees with respect to the pivoting center axis J3 and the pivoting center axis J4.

As shown in FIG. 14, a recess 641a is formed on the upper surface of the permanent magnet 641. The recess 641a is a clearance section for preventing contact of the permanent magnet 641 and the movable plate 611b. Since such a recess 641a is formed, when the movable plate 611b pivots around the pivoting center axis J3, it is possible to prevent the movable plate 611b from coming into contact with the permanent magnet 641.

The coil 642 is formed to surround the outer periphery of the driving section 611a in plan view of FIG. 13. This makes it possible to surely prevent contact of the driving section 611a and the coil 642 when the optical scanner 6 is driven. As a result, it is possible to set a spaced distance between the coil 642 and the permanent magnet 641 relatively short and cause a magnetic field generated from the coil 642 to effectively act on the permanent magnet 641.

The coil 642 is electrically connected to a voltage applying unit 643. When voltage is applied to the coil 642 by the voltage applying unit 643, a magnetic field in an axis direction orthogonal to each of the pivoting center axis J3 and the pivoting center axis J4 is generated from the coil 642.

As shown in FIG. 15, the voltage applying unit 643 includes a first voltage generating unit 643a that generates first voltage V1 for pivoting the movable plate 611b around the pivoting center axis J3, a second voltage generating unit 643b that generates second voltage V2 for pivoting the movable plate 611b around the pivoting center axis J4, and a voltage superimposing unit 643c that superimposes the first voltage V1 and the second voltage V2 and applies the superimposed voltage to the coil 642.

The first voltage generating unit 643a generates the first voltage V1 (voltage for vertical scanning) that periodically changes at a period T1 as shown in FIG. 16A. The first voltage V1 is formed in a wave shape like a saw tooth wave. Therefore, the optical scanner 6 can effectively vertically scan light. The waveform of the first voltage V1 is not limited to this. The frequency (1/T1) of the first voltage V1 is not specifically limited as long as the frequency is suitable for vertical scanning. However, the frequency may be 15 Hz to 40 Hz (about 30 Hz).

In this embodiment, the frequency of the first voltage V1 is adjusted to be a frequency different from a torsional resonance frequency of the first oscillation system 61a including the driving section 611a and the pair of first coupling sections 612a and 613a.

On the other hand, the second voltage generating unit 643b generates the second voltage V2 (voltage for horizontal scanning) that periodically changes at a period T2 different from the period T1. The second voltage V2 is formed in a wave shape like a sine wave. Therefore, the optical scanner 6 can effectively main-scan light. The waveform of the second voltage V2 is not limited to this.

The frequency of the second voltage V2 is not specifically limited as long as the frequency is higher than the frequency of the first voltage V1 and suitable for horizontal scanning. However, the frequency may be 10 kHz to 40 kHz. Since the frequency of the second voltage V2 is set to 10 kHz to 40 kHz in this way and the frequency of the first voltage V1 is set to about 30 Hz as explained above, it is possible to pivot the movable plate 611b around each of the pivoting center axis J3 and the pivoting center axis J4 at a frequency suitable for rendering on the screen. However, for example, a combination of the frequency of the first voltage V1 and the frequency of the second voltage V2 is not specifically limited as long as the movable plate 611b can be pivoted around each of the pivoting center axis J3 and the pivoting center axis J4.

In this embodiment, the frequency of the second voltage V2 is adjusted to be equal to a torsional resonance frequency of the second oscillation system 61b including the movable plate 611b and the pair of second coupling sections 612b and 613b. This makes it possible to increase a pivoting angle of the movable plate 611b around the pivoting center axis J3.

When the resonance frequency of the first oscillation system 61a is represented as $f_1$ [Hz] and the resonance frequency of the second oscillation system 61b is represented as $f_2$ [Hz], $f_1$ and $f_2$ may satisfy a relation of $f_2 > f_1$ or may satisfy a relation of $f_2 \geqq 10 f_1$. This makes it possible to more smoothly pivot the movable plate 611b around the pivoting center axis J4 at the frequency of the second voltage V2 while pivoting the movable plat 611b around the pivoting center axis J3 at the frequency of the first voltage V1.

The first voltage generating unit 643a and the second voltage generating unit 643b are connected to the control unit 400 and driven on the basis of a signal from the control unit 400. The voltage superimposing unit 643c is connected to such first voltage generating unit 643a and second voltage generating unit 643b.

The voltage superimposing unit 643c includes an adder 643d for applying voltage to the coil 642. The adder 643d receives the first voltage V1 from the first voltage generating unit 643a, receives the second voltage V2 from the second voltage generating unit 643b, superimposes these voltages, and applies the superimposed voltage to the coil 642.

The optical scanner 6 having the configuration explained above is driven as explained below.

For example, the first voltage V1 shown in FIG. 16A and the second voltage V2 shown in FIG. 16B are superimposed by the voltage superimposing unit 643c and the superimposed voltage is applied to the coil 642 (the superimposed voltage is also referred to as "voltage V3").

Then, a magnetic field for attracting the S pole side of the permanent magnet 641 to the coil 642 and separating the N pole side from the coil 642 and a magnetic field for separating the S pole side of the permanent magnet 641 from the coil 642 and attracting the N pole side to the coil 642 are alternately switched by the first voltage V1 component in the voltage V3. Consequently, the driving section 611a pivots around the pivoting center axis J3 at the frequency of the first voltage V1 together with the movable plate 611b while torsionally deforming the first coupling sections 612a and 613a.

The frequency of the first voltage V1 is set extremely low compared with the frequency of the second voltage V2. The resonance frequency of the first oscillation system 61a is set lower than the resonance frequency of the second oscillation system 61b. Therefore, the first oscillation system 61a more easily oscillates than the second oscillation system 61b. It is possible to prevent the movable plate 611b from being pivoted around the pivoting center axis J4 by the first voltage V1 component.

On the other hand, a magnetic field for attracting the S pole side of the permanent magnet 641 to the coil 642 and separating the N pole side from the coil 642 and a magnetic field for separating the S pole side of the permanent magnet 641 from the coil 642 and attracting the N pole side to the coil 642 are alternately switched by the second voltage V2 component in the voltage V3. Consequently, the movable plate 611b pivots around the pivoting center axis J4 at the frequency of the second voltage V2 together with the movable plate 611b while torsionally deforming the second coupling sections 612b and 613b.

Since the frequency of the second voltage V2 is equal to the torsional resonance frequency of the second oscillation system 61b, the movable plate 611b can be dominantly pivoted around the pivoting center axis J4 by the second voltage V2. Therefore, it is possible to prevent the movable plate 611b from being pivoted around the pivoting center axis J3 together with the driving section 611a by the second voltage V2 component.

With the optical scanner 6 explained above, it is possible to two-dimensionally scan the laser beam LL with one optical scanner and realize saving of a space of the light scanning unit 300. For example, when the pair of optical scanners are used as in the first embodiment, a relative positional relation between the optical scanners has to be highly accurately set. However, since this is unnecessary in this embodiment, it is possible to realize simplification of manufacturing.

According to such a fourth embodiment, it is possible to realize effects same as those in the first embodiment.

The image forming apparatus explained above can be suitably applied to, for example, a rear projection display apparatus (a rear projector). As a result, it is possible to provide a rear projector having an excellent rendering characteristic.

Figure 17:
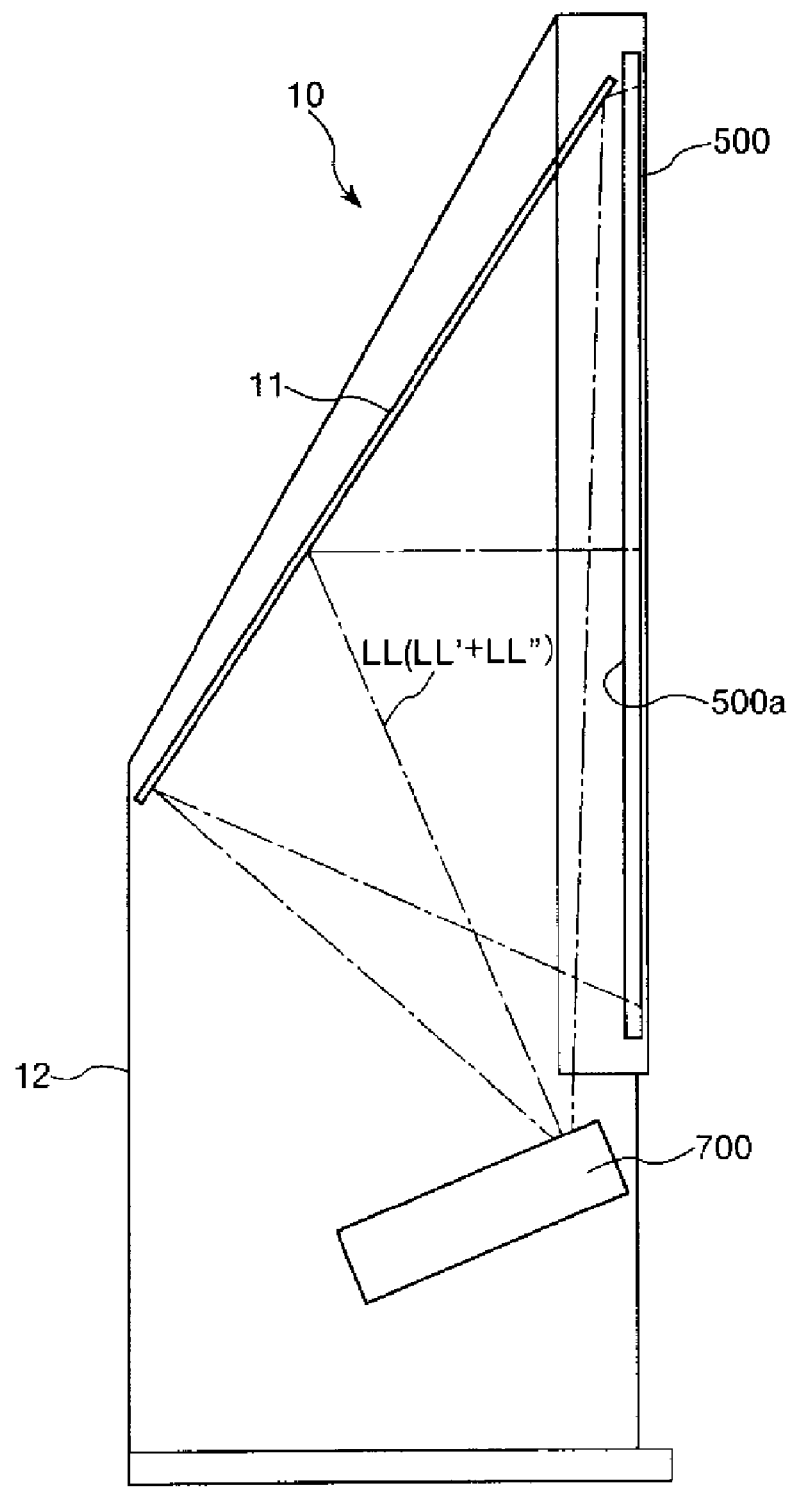
FIG. 17 is a diagram showing a schematic configuration of a rear projection display apparatus according to the invention.

As shown in FIG. 17, a rear projector 10 has a configuration in which the projector 700, a light guide mirror 11, and the screen 500 are arranged in a housing 12. The screen 500 is arranged with the first substrate 510 side faced inward to the housing 12. Such a rear projector 10 reflects, with the light guide mirror 11, the address light LL' and the display light LL" emitted from the projector 700 and scans the address light LL' and the display light LL" on the display surface 500a of the screen 500.

In the rear projector 10, the observer visually recognizes the screen 500 from the rear side (the opposite side of the display surface 500a). Therefore, the projector 700 may scan the address light LL' and the display light LL" such that a mirror image of an image that the user desires to cause the observer to observe is displayed on the display surface 500a.

The image forming apparatus and the rear projection display apparatus according to the invention are explained above with reference to the embodiments shown in the figures. However, the present invention is not limited to the embodiments. The components can be replaced with arbitrary ones having the same functions. Other arbitrary components may be added to the invention. Arbitrary two or more components (characteristics) in the embodiments may be combined.

The entire disclosure of Japanese Patent Application No. 2010-039382, filed Feb. 24, 2010 is expressly incorporated by reference herein.

What is claimed is:

1. An image forming apparatus comprising:
a screen having a display surface; and
a projector that renders an image by scanning light on the display surface, wherein
the screen selects, independently in respective regions of the display surface, a light transmission state in which the light is transmitted and a light diffusion state in which the light is diffused, the screen being configured such that the region where address light is irradiated is in the light diffusion state and the region where the address light is not irradiated is in the light transmission state, and
the projector scans the address light on the display surface such that an area of the display surface corresponding to an image displayed on the display surface changes to the light diffusion state.

2. The image forming apparatus according to claim 1, wherein the address light is an infrared ray.

3. The image forming apparatus according to claim 1, wherein the projector scans the address light and scans display light for displaying the image in the area changed to the light diffusion state by the irradiation of the address light to thereby display a desired image on the display surface.

4. The image forming apparatus according to claim 3, wherein the projector scans combined light obtained by combining the address light and the display light on the display surface.

5. The image forming apparatus according to claim 4, wherein the projector includes:
an address light source that emits the address light;
a display light source that emits the display light; and
a light scanning unit that reflects the combined light and scans the combined light on the display surface.

6. The image forming apparatus according to claim 5, wherein the light scanning unit includes an optical scanner in which a movable plate including a light reflecting section having light reflection properties is provided to be pivotable in at least one direction or two directions orthogonal to each other and that scans light reflected by the light reflecting section on the display surface.

7. The image forming apparatus according to claim 6, wherein the projector includes a control unit that determines, from image data displayed on the display surface, an area of the display surface changed to the light diffusion state and controls actuation of the address light source, the display light source, and the light scanning unit such that the address light is irradiated on the determined area and the display light is irradiated on an area changed to the light diffusion state by the irradiation of the address light.

8. The image forming apparatus according to claim 7, wherein, when directions orthogonal to each other in plan view of the display surface are represented as x direction and y direction,
the light scanning unit scans the combined light in the y direction while scanning the combined light in the x direction to thereby scan the combined light on the display surface, and
the control unit determines, on the basis of the image data, amplitude of the combined light scanned on the display surface by the light scanning unit in the x direction and amplitude of the combined light in the y direction.

9. The image forming apparatus according to claim 1, wherein the projector is not arranged in an area formed by extending a contour of the screen in a direction orthogonal to the display surface.

10. The image forming apparatus according to claim 1, wherein the projector is set within 1 m from a region of the display surface closest to the projector.

11. The image forming apparatus according to claim 1, wherein, in the screen, a first substrate having light transmission properties on which a first electrode is formed, a photoconductive film on which electric resistance of a region where the address light is irradiated falls, a liquid crystal layer in which liquid crystal is dispersed, and a second substrate having light transmission properties on which a second electrode is formed are provided in this order from the display surface side.

12. The image forming apparatus according to claim 11, wherein the liquid crystal layer is a liquid crystal polymer composite layer in which the liquid crystal and a polymer are separated, the liquid crystal and the polymer have refractive index anisotropy, and, when voltage is applied between the first electrode and the second electrode, the liquid crystal layer takes, according to intensity of voltage applied to the liquid crystal polymer composite layer, the light transmission state in which the liquid crystal and the polymer are oriented in the same direction and the light diffusion state in which the liquid crystal and the polymer are orientated in different directions.

13. The image forming apparatus according to claim 12, wherein, when the intensity of the voltage at which the light transmission state and the light diffusion state are switched is represented as V, in a state in which voltage for not increasing the intensity of the voltage applied to the liquid crystal polymer composite layer to be larger than the intensity V is applied between the first electrode and the second electrode, the address light is irradiated on a region of the display surface changed to the light diffusion state and electric resistance of a region of the photoconductive film where the address light is irradiated is reduced, whereby intensity of voltage acting on a region of the liquid crystal polymer composite layer where the address light is irradiated is increased to be larger than the intensity V and a region of the display surface where the address light is irradiated is changed from the light transmission state to the light diffusion state.

14. A rear projection display apparatus comprising:
a housing;
a screen that is fixed to the housing and has a display surface; and
a projector that is arranged in the housing and scans light on the display surface to thereby render an image, wherein
the screen selects, independently in respective regions of the display surface, a light transmission state in which the light is transmitted and a light diffusion state in which the light is diffused, the screen being configured such that the region where address light is irradiated is in the light diffusion state and the region where the address light is not irradiated is in the light transmission state, and
the projector scans the address light on the display surface such that an area of the display surface corresponding to an image displayed on the display surface changes to the light diffusion state.

\* \* \* \* \*